US012777352B2

(12) United States Patent
Han et al.

(10) Patent No.: US 12,777,352 B2
(45) Date of Patent: Oct. 27, 2026

(54) MEASUREMENT REPORTING EFFICIENCY ENHANCEMENT

(71) Applicant: Intel Corporation, Santa Clara, CA (US)

(72) Inventors: Jaemin Han, Portland, OR (US); Dawei Ying, Portland, OR (US); Leifeng Ruan, Beijing (CN); Richard Burbidge, Shrivenham (GB)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 18/391,353

(22) Filed: Dec. 20, 2023

(65) Prior Publication Data

US 2024/0155393 A1 May 9, 2024

Related U.S. Application Data

(60) Provisional application No. 63/483,201, filed on Feb. 3, 2023.

(51) Int. Cl.
*H04W 24/10* (2009.01)

(52) U.S. Cl.
CPC .................................. *H04W 24/10* (2013.01)

(58) Field of Classification Search
CPC .............................. H04W 24/10; H04W 28/02
See application file for complete search history.

(56) References Cited

U.S. PATENT DOCUMENTS

2022/0330070 A1* 10/2022 Song ................ H04W 28/0268

OTHER PUBLICATIONS

ORAN-WG3. E2SM-NI-v01.00.00, Technical Specification, O-RAN Working Group 3, Near-Real-time RAN Intelligent Controller E2 Service Model (E2SM), Ran Function Network Interface (NI) (Year: 2020).*

* cited by examiner

*Primary Examiner* — Charles C Jiang
*Assistant Examiner* — Margaret Marie Anderson
(74) *Attorney, Agent, or Firm* — Gray Ice Higdon, PLLC

(57) ABSTRACT

This disclosure describes systems, methods, and devices related to enhanced measurement reporting. The device may generate radio access network (RAN) measurement parameters to configure an E2 node in Open Radio Access Network (O-RAN). The device may transmit an action definition to the E2 node through an E2 interface, wherein the action definition comprises a measured value reporting conditions information element (IE) based on the RAN measurement parameters, indicating to the E2 node to generate measurement reports. The device may identify the measurement reports received from the E2 node.

18 Claims, 8 Drawing Sheets

MEASUREMENT REPORTING EFFICIENCY ENHANCEMENT

CROSS-REFERENCE TO RELATED PATENT APPLICATION(S)

This application claims the benefit of U.S. Provisional Application No. 63/483,201, filed Feb. 3, 2023, the disclosure of which is incorporated herein by reference as if set forth in full.

TECHNICAL FIELD

This disclosure generally relates to systems and methods for wireless communications and, more particularly, to measurement reporting efficiency enhancement.

BACKGROUND

Wireless devices are becoming widely prevalent and are increasingly requesting access to wireless channels. Open RAN Alliance (O-RAN) is committed to evolve radio access networks. The O-RAN will be deployed based on 3GPP defined network slicing technologies.

DETAILED DESCRIPTION

Figure 1:
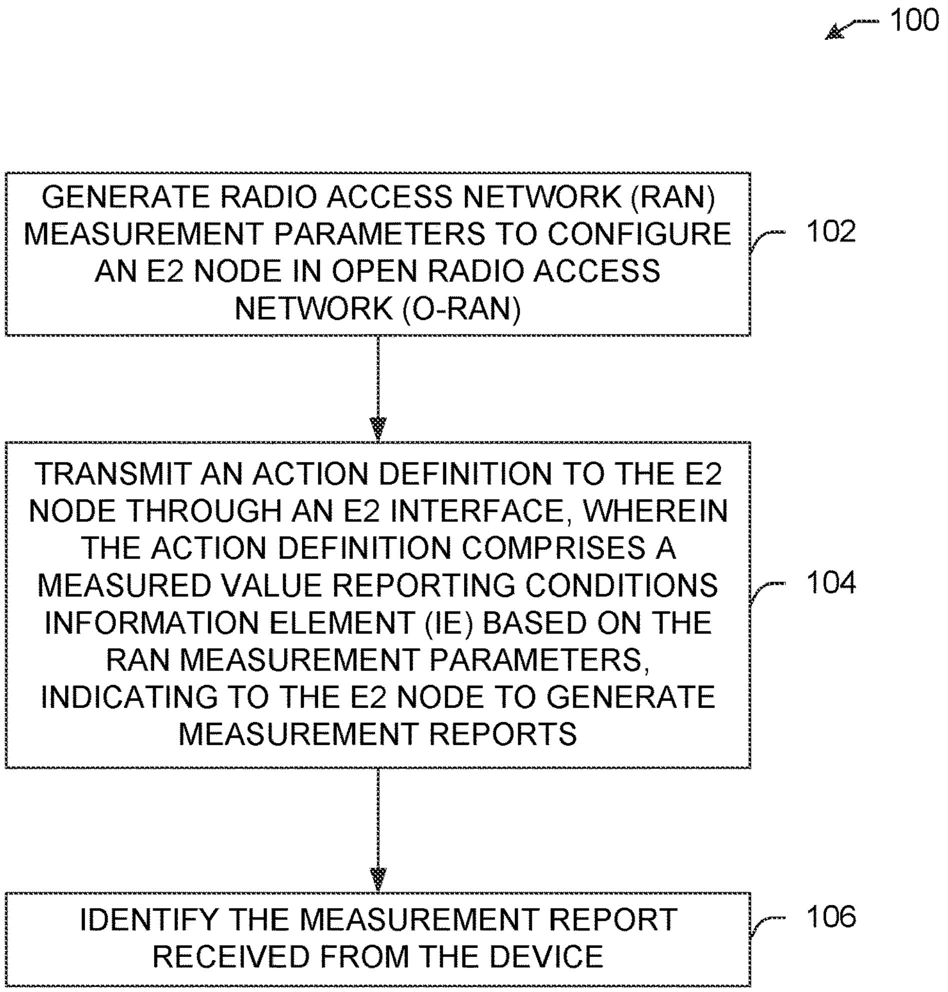
FIG. 1 illustrates a flow diagram of illustrative process for an illustrative enhanced measurement reporting system, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Open Radio Access Network (O-RAN) has been striving to embrace artificial intelligence (AI) and machine learning (ML) based intelligence into wireless communication networks [1]. The purpose of introducing AI/ML spans not only to increase performance of existing networks, but also to optimize/steer various network components to a certain key performance indicator (KPI) of interest in an efficient and elegant way.

Currently, there are many use cases being considered for such AI/ML based intelligence [2]. Feeding accurate and timely measurement information in RAN that are necessary and useful to the intelligence controller is the very first step to succeed in those optimizations.

With respect to Near-RT (real time) RAN intelligence controller (RIC), those measurements required from RAN nodes (e.g. UE-level, cell-level, etc.) are retrieved via the REPORT services defined in E2 service model (E2SM)—key performance measurements (KPM) [3]. Through REPORT services, Near-RT RIC subscribes which metrics to measure and for which cell/UEs, based on which a RAN node performs measurements accordingly and periodically sends the report as configured.

However, some inefficiency are observed in the current E2SM-KPM subscription and reporting framework [3] which may lead to the waste of E2 interface resources and unnecessary processing burdens.

Currently, regardless of whether a measured value (the outcome of a measurement performed by RAN node) are meaningful or not, RAN node has to report "any" produced measured values as configured to perform measurements by Near-RT RIC. A measured value for a certain sampling period could be useless for Near-RT RIC. For example, for a measurement of counting some events, its measured value could be 1 for one sampling period but 0 for the next sampling period, the latter of which is not essential to be reported. Such useless measured values in a report, if too many, would unnecessarily increase the report size and eventually waste E2 interface resources, which can be saved if skipped otherwise.

In general, there should be some mechanism for Near-RT RIC to configure "which measured values" that are useful for Near-RT RIC should be reported from RAN nodes. If Near-RT RIC is able to receive the measurements from RAN nodes that are only necessary and useful from the beginning, then this would not only save E2 interface resources, but also reduce the processing burdens of Near-RT RIC. The present disclosure discusses several ways to achieve such reporting efficiency in E2SM-KPM.

[1] O-RAN WG1, "O-RAN Architecture Description"

[2] O-RAN WG3, "Near-Real-time RAN Intelligent Controller; E2 Application Protocol (E2AP)"

[3] O-RAN WG3, "Near-Real-time RAN Intelligent Controller E2 Service Model (E2SM) KPM"

Example embodiments of the present disclosure relate to systems, methods, and devices for E2SM-KPM measurement reporting efficiency enhancement.

In the context of O-RAN, two types of RAN Intelligence Controllers (RICs) are fundamental: the Non Real-time (Non-RT) RIC and the Near Real-time (Near-RT) RIC, each aligning with different control timescales. The Non-RT RIC is designed for slower control processes, operating within a range of a few hundred milliseconds to several seconds. In contrast, the Near-RT RIC caters to more rapid control requirements, functioning within a much tighter timeframe of a few milliseconds up to approximately 10 milliseconds. A key aspect of the Near-RT RIC is its E2 interface, which facilitates communication with lower network elements such as O-RAN Central Unit—Control Plane (O-CU-CP), O-RAN Central Unit—User Plane (O-CU-UP), and O-RAN Distributed Unit (O-DU), playing a crucial role in the efficient operation and management of the network. In the O-RAN architecture, the E2 interface is critical for enabling communication between the Near-RT RIC and the network's O-CU-CP, O-CU-UP, and O-DU. It should noted that the use of O-CU includes O-CU-CP and O-CU-UP. This E2 interface supports dynamic RAN resource management, allowing the Near-RT RIC to effectively transmit control and management directives to these elements. Its primary role is to facilitate real-time operational efficiency, handling tasks requiring rapid response, typically within milliseconds to tens of milliseconds.

The E2 interface significantly enhances the flexibility, scalability, and performance of O-RAN networks. It is instrumental in executing various network functions, including load balancing, interference management, and resource allocation, catering to the network's and users' specific requirements. As part of the O-RAN Alliance's standardization efforts, the E2 interface promotes interoperability across different vendors' equipment, fostering a diverse and competitive RAN solution marketplace. This interface is vital in realizing O-RAN's vision to create more open, intelligent, and interoperable RANs, thus playing a significant role in the progression and efficiency of 5G networks and beyond. Furthermore, an E2 node represents any network element within the RAN that utilizes the E2 interface. The E2 node is vital for effective communication between the RAN and the network core, enabling the optimal coordination and management of network resources.

In one or more embodiments, an enhanced measurement reporting system may allow Near-RT RIC to make RAN nodes (also referred to as E2 nodes, interconnected over E2 interface) report measurement values that are necessary and useful for Near-RT RIC among subscribed measurements, for which not only can reduce the report size and save E2 interface resources, but also can reduce the processing burdens of Near-RT RIC.

In one or more embodiments, an enhanced measurement reporting system may facilitate DU and CU reporting to the Near-RT RIC. DU and CU play crucial roles in the architecture of the RAN. The DU is a fundamental component in the RAN, responsible for the lower-layer functionalities. These include real-time processing tasks related to the physical layer of the network, such as modulation/demodulation, Forward Error Correction (FEC), and handling the radio protocols. The DU is typically located closer to the radio antenna, often at the cell site. This proximity to the radio hardware enables efficient processing of high-bandwidth, low-latency tasks, essential for the performance of the 5G network. The CU, on the other hand, is responsible for the higher-layer functionalities of the RAN. This includes the non-real-time processing tasks such as the control plane of the radio protocols, session management, and the orchestration of network resources. The CU can be situated at a more centralized location, often at the network edge or in data centers. It interfaces with the core network and manages multiple DUs, overseeing the broader operational aspects of the network. The separation of these functions into DU and CU allows for more flexible and scalable network architectures. This modularity enables network operators to efficiently manage and deploy resources where needed, optimizing performance and reducing latency. The division also aligns with the trend towards virtualization and cloud-based RAN (C-RAN) architectures in modern cellular networks, where network functions are increasingly being software-defined and deployed on commodity hardware.

In one or more embodiments, an enhanced measurement reporting system may facilitate an innovative approach to enhance the efficiency of the E2 interface in the O-RAN architecture. Previously, the E2 Service Model (ESM) allowed the Near-RT RIC to request O-CU-CP, O-CU-UP, and O-DU to report specific measurements from the RAN, focusing on various aspects of User Equipments (UEs) like periodic updates or event-triggered data. The enhanced measurement reporting system aims to refine this reporting mechanism by integrating additional features.

In many existing scenarios, an extensive number of UEs connect to the network, leading to a complex array of parameters, measurements, or KPIs that the Near-RT RIC can monitor. However, not all these data points are essential, and they often contribute to significant overhead. The enhanced measurement reporting system addresses this issue by empowering the Near-RT RIC to filter out less critical data. It introduces a capability for the Near-RT RIC to instruct the O-CU-CP, O-CU-UP, and O-DU to report values only under specific conditions. For instance, the system could be set to report only if the values exceed or fall below certain thresholds, or if they contain particular crucial elements.

Additionally, the enhanced measurement reporting system adds a layer of flexibility to the reporting process. The Near-RT RIC sends a control message to the E2 nodes (O-CU-CP, O-CU-UP, and O-DU), specifying the data to be reported. This system allows the Near-RT RIC to direct the E2 nodes to report only certain elements that are of greater interest, such as specific counters or KPIs that exceed a predefined value. This targeted approach to data reporting enhances the overall efficiency and effectiveness of the network management and reduces unnecessary reporting, aligning more closely with the strategic objectives and operational needs of the network. In other words, the enhanced measurement reporting system may provide additional flexibility indicating to the E2 nodes when they send a report, they do not need to report everything but instead report certain information based on a new structure provided in the control message, for example, certain counters or when the KPI meets a certain threshold.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

In one or more embodiments, an enhanced measurement reporting system may facilitate that new IEs can be defined in the existing action definition format 1 (ADF1) of E2SM-KPM used for subscription request from Near-RT RIC, in order for Near-RT RIC to configure a RAN node. The action definition information element (IE) is part of the RIC SUBSCRIPTION REQUEST message, which is a message sent from the Near-RT RIC to E2 nodes (O-CU/O-DU), configuring what to report and which values to include or exclude. The indication message IE is part of the RIC INDICATION message, which is the message from E2 nodes to Near-RT RIC.

In one or more embodiments, an enhanced measurement reporting system may facilitate integrating the newly introduced IEs into the ADF1 framework. This approach, which aligns with the embodiments described herein, involves modifications to the E2SM-KPM specification. These proposed changes are clearly highlighted with underlining. The IE may comprise a Measured Value Reporting Condition structure, where one or more of this structure may be used. The number of times the structure may be present in the IE ranges from 0 to <maxnoofConditionInfo>. In E2SM-KPM [3], the explanation of this constant is "Maximum no. of conditions that can be subscribed for a single measurement type, where the value is <32768>."

The Measured Value Reporting Condition structure may comprise a test condition, a test condition value, and a logical OR. The test condition may be enumerated. For example, equal to, greater than, less than, contains, present, etc. The test condition value follows section 8.3.23 in E2SM-KPM [3], which is provided here: the test condition value IE may be integral in defining the target value corresponding to a specific test condition. This IE is structured to accommodate a variety of data types, ensuring versatility and adaptability in various scenarios. It includes a "CHOICE Test Value" field, which is a mandatory component of the IE. This field offers a range of data types to precisely match the requirements of the test conditions. The IE allows for comprehensive and precise definition of target values for various test conditions, enhancing the functionality and efficiency of the system.

The and the logical OR follows section 8.2.25 of E2SM-KPM [3], which is provided here: the logical OR IE may signify a logical "or" connection of the current condition to the subsequent condition within a specified sequence. This IE, categorized under the group name 'Logical OR', is defined as an ENUMERATED type, with values including 'true' among others. The semantics of this IE, when set to 'true', establish an "or" logical connection to the next condition in the sequence.

For a comprehensive understanding, refer to Table 1 presented below, which illustrates these modifications in detail.

TABLE 1

E2SM-KPM Action Definition Format 1

| IE/Group Name | Presence | Range | IE type and reference | Semantics description |
|---|---|---|---|---|
| Measurement Information List | | 1 . . . <maxnoofMeasurementInfo> | | |
| >CHOICE Measurement Type | | | | |
| >>Measurement Name | M | | 8.3.9 Measurement Type Name | |
| >>Measurement ID | M | | 8.3.10 Measurement Type ID | |
| >List of Labels | | 1 . . . < maxnoofLabelInfo > | | |
| >>Label Information | M | | 8.3.11 Measurement Label | |
| **>Measured Value Reporting Condition** | | ***0.. <maxnoofConditionInfo>*** | | |
| **>>Test Condition** | **O** | | **ENUMERATED (equal, greaterthan, lessthan, contains, present, ...)** | |
| **>>Test Condition Value** | **O** | | **8.3.23** | |
| **>>Logical OR** | **O** | | **8.3.25** | |
| Granularity Period | M | | 8.3.8 Granularity Period | Collection interval of measurements |
| Cell Global ID | O | | 8.3.20 Cell Global ID | Points to a specific cell for generating measurements subscribed by the Measurement Information List IE |
| Distribution Measurement Bin Range Info List | | 0 . . . <maxnoofMeasurementInfo> | | |
| >CHOICE Measurement Type | | | | |
| >>Measurement Name | M | | 8.3.9 Measurement Type Name | |
| >>Measurement ID | M | | 8.3.10 Measurement Type ID | |
| >Bin Range Definition | M | | 8.3.26 | Indicates the value ranges of bins for distribution type measurement |

available data types include INTEGER, ENUMERATED, BOOLEAN, BIT STRING, OCTET STRING, PRINTABLE STRING, and REAL. Each of these types is associated with its respective semantic description. The INTEGER type is used for both the "INTEGER" and "ENUMERATED" choices, providing a numeric representation. BOOLEAN type is used for straightforward true/false conditions. BIT STRING and OCTET STRING types are utilized for more complex data structures, offering flexibility in data representation. The PRINTABLE STRING type accommodates human-readable text, specified as "PrintableString". Lastly, the REAL type is included for conditions requiring real number values. This diverse range of data types within the IE allows for comprehensive and precise definition of target values for various test conditions, enhancing the functionality and efficiency of the system.

Or alternatively, new ADF could be defined for Near-RT RIC to configure a RAN node, some conditions on which measured values shall be included in the KPM report message of Indication Message Format (IMF).

Once successfully configured, the RAN node will not include the measured values for the corresponding measurements in the sampling periods whose measured value does not satisfy the configured reporting condition.

In another embodiment, instead of RAN node skipping to include (omitting or excluding) the measured value that does not satisfy the configured reporting condition, the RAN node may be configured to insert a certain value that can efficiently indicate that the measured value did not satisfy the configured condition. This indicator could be e.g. "Not Valid" choice code point in the existing ASN.1 reporting record structure that does not take up additional space.

TABLE 2

| | | | | |
|---|---|---|---|---|
| >Measurements Record | | 1 . . . <maxnoofMeasurementValue> | | Contains measured values in same order as in the Measurements Information List IE if present, otherwise in the order defined in the subscription. |
| >>CHOICE Measured Value | | | | |
| >>>Integer Value | M | | INTEGER (0 . . . 4294967295) | |
| >>>Real Value | M | | REAL | |
| >>>No Value | M | | NULL | |
| **>>>Not Valid** | **M** | | **ENUMERATED (true, ...)** | |

Note that the way that the measured values are included in the KPM report message (e.g. defined by Indication Message Format (IMF)) is common for all the REPORT styles of E2SM-KPM, where for each sampling period, "Measurement Record" is compiled as shown above, which is a list of measured values. Each measured value is a choice structure of either INTEGER (takes up 4 bytes when the choice header=00) or REAL (takes up 4 bytes or higher depending on implementation when the choice header=01) or "No Value" (doesn't take any space as this can be indicated directly by the choice header=10). As a result, additional choice code point of "Not Valid" (which can be directly indicated by the choice header=11) may be added without increasing any report size, which can be used to indicate that the measured value did not satisfy the configured reporting condition. This could save up the report size a lot, considering that even saying the measured value of 0 of INTEGER type takes up 4 bytes. Moreover, this approach could be useful if the orders of the measured values for each measurement record (corresponding to each sampling period) has to be consistent in the KPM report message and thus skipping cannot work (which may create the different orders of the measured values for each measurement record).

In one or more embodiments, an enhanced measurement reporting system may implement a method of minimizing the size of measurement reports in a network system. This system may encompass a RAN and a RIC, interconnected via an E2 interface. Within this framework, the RAN may perform measurements and report these to the RIC. The enhanced measurement reporting system may allow the RIC to configure which RAN measurements are to be performed. Furthermore, the RIC may provide configuration to the RAN regarding which measurement results should be included in the measurement report sent back to the RIC.

Additionally, the enhanced measurement reporting system may enable the RIC to provide configuration to the RAN on which measurement results need to be included or excluded from the measurement report when the RIC configures the RAN on which measurements to perform. In this context, the RAN may generate the measurement report and send it to the RIC, omitting certain measurement results based on the configuration received from the RIC. The system may also allow the RAN to indicate which measurement results have been skipped in the report, based on the RIC's configuration on the inclusion or exclusion of specific measurement results.

In these embodiments, the configurations and reporting processes utilized by the enhanced measurement reporting system may be based on the E2SM-KPM services. This approach ensures that the network system efficiently manages and relays crucial measurement data, aligning with the operational requirements and optimization strategies of the network.

It is understood that the above descriptions are for the purposes of illustration and are not meant to be limiting.

Figure 2:
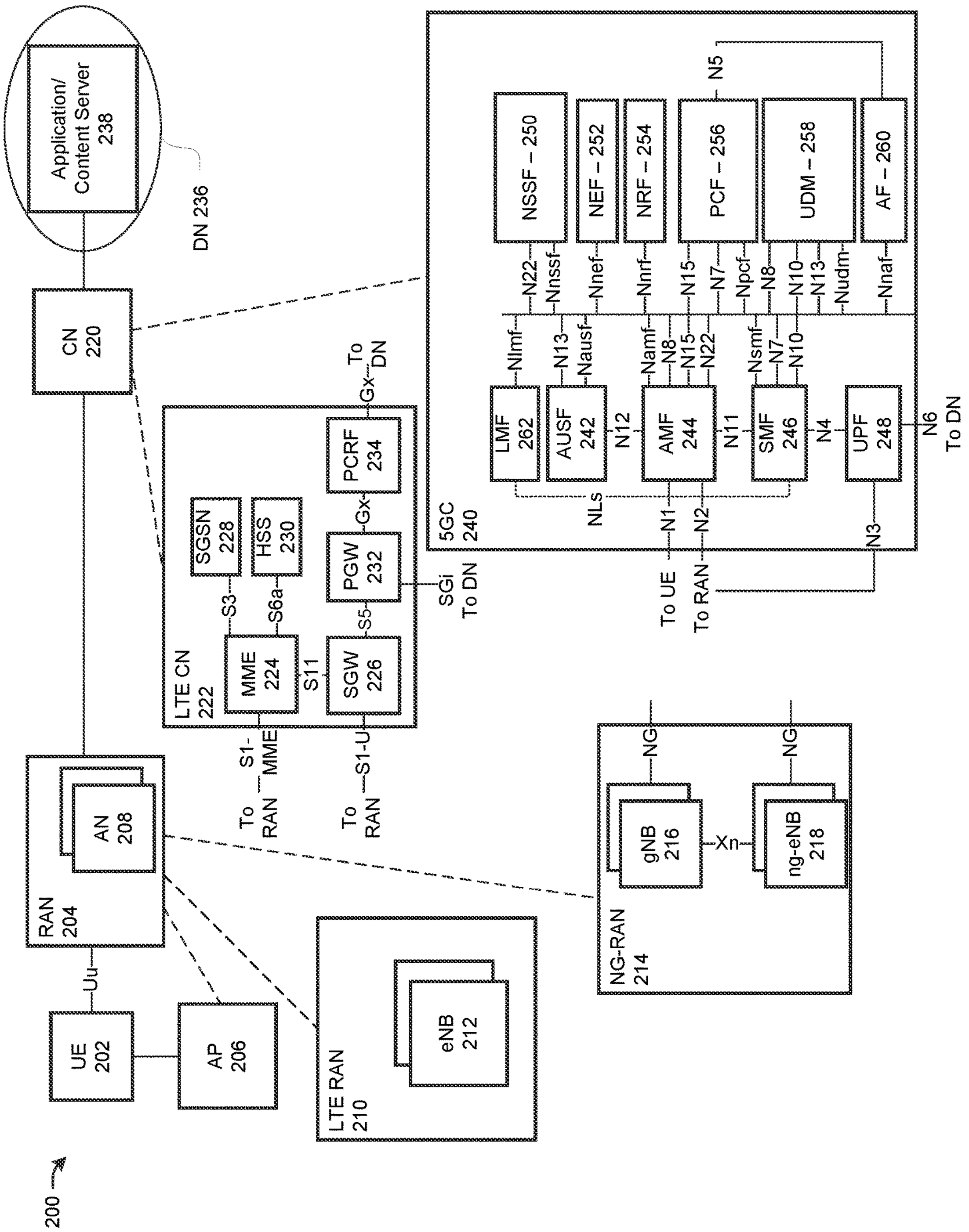
FIG. 2 illustrates an example network architecture, in accordance with one or more example embodiments of the present disclosure.
Figure 3:
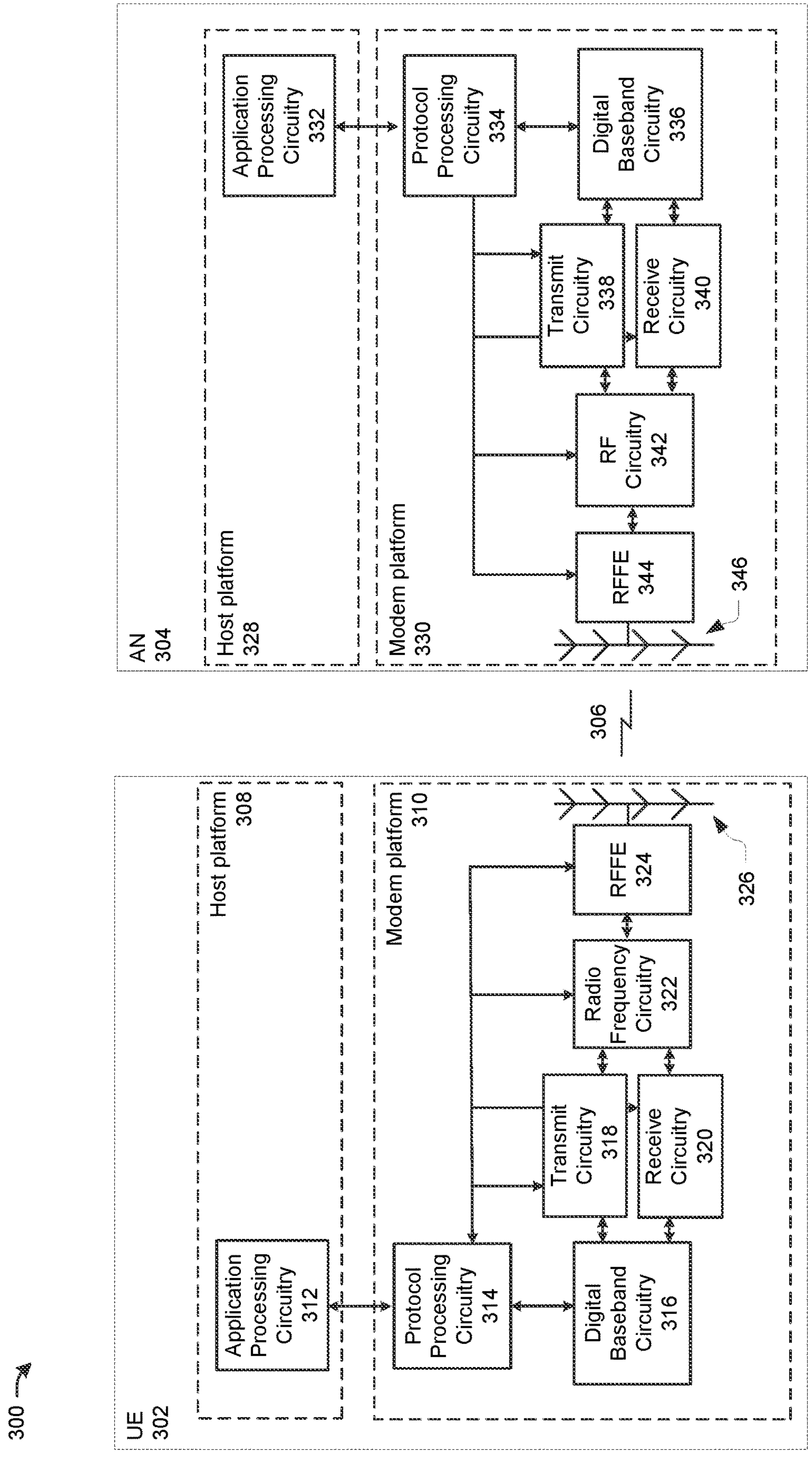
FIG. 3 schematically illustrates a wireless network, in accordance with one or more example embodiments of the present disclosure.
Figure 4:
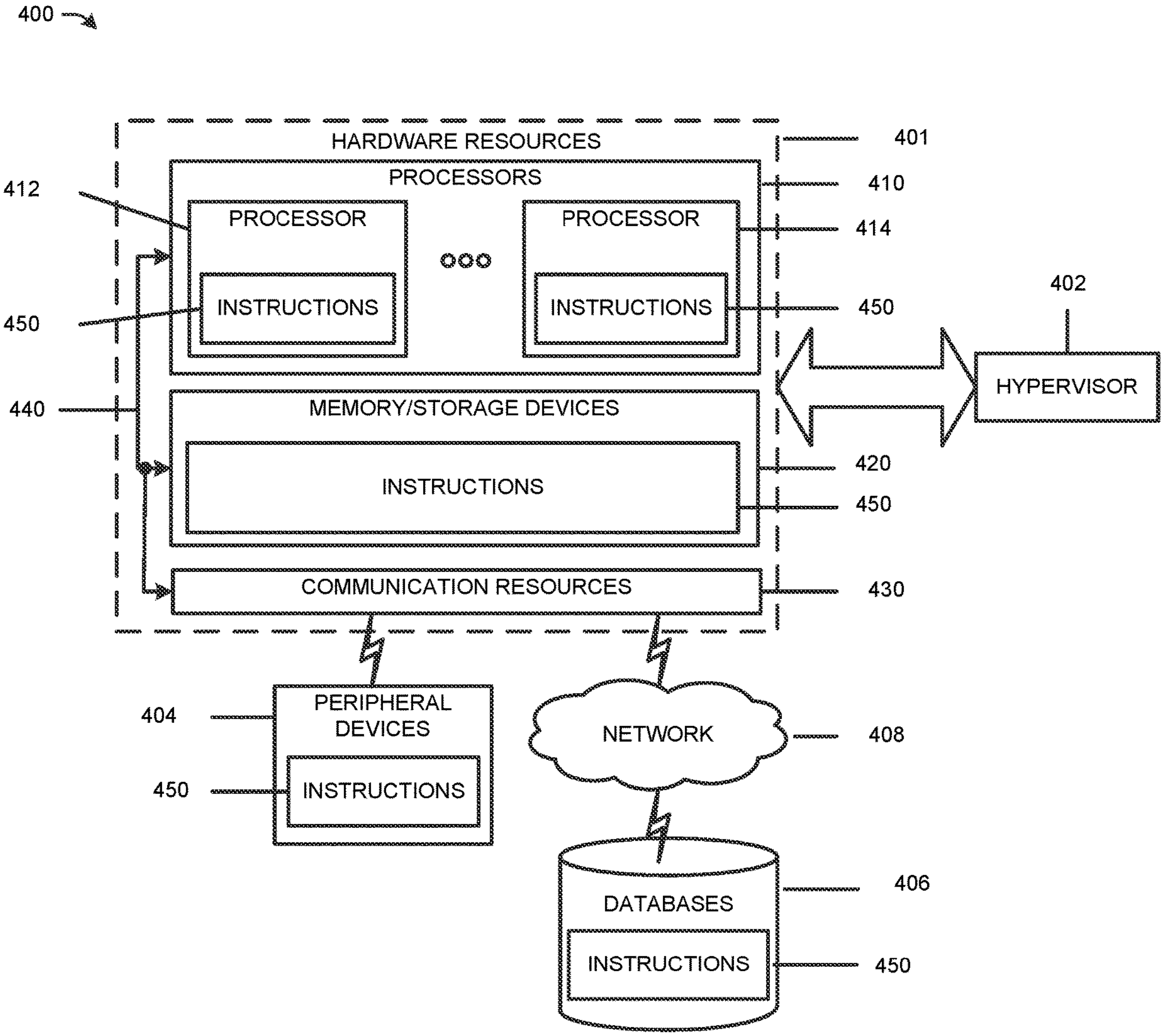
FIG. 4 illustrates components of a computing device, in accordance with one or more example embodiments of the present disclosure.

In some embodiments, the electronic device(s), network(s), system(s), chip(s) or component(s), or portions or implementations thereof, of FIGS. 2-4, or some other figure herein, may be configured to perform one or more processes, techniques, or methods as described herein, or portions thereof. One such process is depicted in FIG. 1.

The process further includes, at 102, generate radio access network (RAN) measurement parameters to configure an E2 node in Open Radio Access Network (O-RAN).

The process further includes, at 104, transmit an action definition to the E2 node through an E2 interface, wherein the action definition comprises a measured value reporting conditions information element (IE) based on the RAN measurement parameters, indicating to the E2 node to generate measurement reports.

The process further includes, at 106, identify the measurement reports received from the E2 node.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is understood that the above descriptions are for purposes of illustration and are not meant to be limiting.

FIGS. 2-8 illustrate various systems, devices, and components that may implement aspects of disclosed embodiments.

FIG. 2 illustrates an example network architecture 200 according to various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 includes a UE 202, which is any mobile or non-mobile computing device designed to communicate with a RAN 204 via an over-the-air connection. The UE 202 is communicatively coupled with the RAN 204 by a Uu interface, which may be applicable to both LTE and NR systems. Examples of the UE 202 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 200 may include a plurality of UEs 202 coupled directly with one another via a D2D, ProSe, PC5, and/or sidelink (SL) interface. These UEs 202 may be M2M/D2D/MTC/IoT devices and/or vehicular systems that communicate using physical sidelink channels such as, but not limited to, PSBCH, PSDCH, PSSCH, PSCCH, PSFCH, etc. The UE 202 may perform blind decoding attempts of SL channels/links according to the various embodiments herein.

In some embodiments, the UE 202 may additionally communicate with an AP 206 via an over-the-air (OTA) connection. The AP 206 manages a WLAN connection, which may serve to offload some/all network traffic from the RAN 204. The connection between the UE 202 and the AP 206 may be consistent with any IEEE 802.11 protocol. Additionally, the UE 202, RAN 204, and AP 206 may utilize cellular-WLAN aggregation/integration (e.g., LWA/LWIP). Cellular-WLAN aggregation may involve the UE 202 being configured by the RAN 204 to utilize both cellular radio resources and WLAN resources.

The RAN 204 includes one or more access network nodes (ANs) 208. The ANs 208 terminate air-interface(s) for the UE 202 by providing access stratum protocols including RRC, PDCP, RLC, MAC, and PHY/L1 protocols. In this manner, the AN 208 enables data/voice connectivity between CN 220 and the UE 202. The ANs 208 may be a macrocell base station or a low power base station for providing femtocells, picocells or other like cells having smaller coverage areas, smaller user capacity, or higher bandwidth compared to macrocells; or some combination thereof. In these implementations, an AN 208 be referred to as a BS, gNB, RAN node, eNB, ng-eNB, NodeB, RSU, TRxP, etc.

One example implementation is a "CU/DU split" architecture where the ANs 208 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v16.1.0 (2020-03)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 208 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 204 is an LTE RAN or Evolved Universal Terrestrial Radio Access Network (E-UTRAN) 210) or an Xn interface (if the RAN 204 is a NG-RAN 214). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs 208 of the RAN 204. For example, the UE 202 and RAN 204 may use carrier aggregation to allow the UE 202 to connect with a plurality of component carriers, each corresponding to a Pcell or Scell. In dual connectivity scenarios, a first AN 208 may be a master node that provides an MCG and a second AN 208 may be secondary node that provides an SCG. The first/second ANs 208 may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 204 may be an E-UTRAN 210 with one or more eNBs 212. The an E-UTRAN 210 provides an LTE air interface (Uu) with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 204 may be an next generation (NG)-RAN 214 with one or more gNB 216 and/or on or more ng-eNB 218. The gNB 216 connects with 5G-enabled UEs 202 using a 5G NR interface. The gNB 216 connects with a 5GC 240 through an NG interface, which includes an N2 interface or an N3 interface. The ng-eNB 218 also connects with the 5GC 240 through an NG interface, but may connect with a UE 202 via the Uu interface. The gNB 216 and the ng-eNB 218 may connect with each other over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

The 5G-NR air interface may utilize BWPs for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amount of frequency resources (e.g., PRBs) to support data transmission under different traffic loading scenarios. A BWP containing a smaller number of PRBs can be used for data transmission with small traffic load while allowing power saving at the UE 202 and in some cases at the gNB 216. A BWP containing a larger number of PRBs can be used for scenarios with higher traffic load.

The RAN 204 is communicatively coupled to CN 220 that includes network elements and/or network functions (NFs) to provide various functions to support data and telecommunications services to customers/subscribers (e.g., UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

The CN 220 may be an LTE CN 222 (also referred to as an Evolved Packet Core (EPC) 222). The EPC 222 may include MME 224, SGW 226, SGSN 228, HSS 230, PGW 232, and PCRF 234 coupled with one another over interfaces (or "reference points") as shown. The NFs in the EPC 222 are briefly introduced as follows.

The MME 224 implements mobility management functions to track a current location of the UE 202 to facilitate paging, bearer activation/deactivation, handovers, gateway selection, authentication, etc.

The SGW 226 terminates an S1 interface toward the RAN 210 and routes data packets between the RAN 210 and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 tracks a location of the UE 202 and performs security functions and access control. The SGSN 228 also performs inter-EPC node signaling for mobility between different RAT networks; PDN and S-GW selection as specified by MME 224; MME 224 selection for handovers; etc. The S3 reference point between the MME 224 and the SGSN 228 enable user and bearer information exchange for inter-3GPP access network mobility in idle/active states.

The HSS 230 includes a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable transfer of subscription and authentication data for authenticating/authorizing user access to the EPC 220.

The PGW 232 may terminate an SGi interface toward a data network (DN) 236 that may include an application (app)/content server 238. The PGW 232 routes data packets between the EPC 222 and the data network 236. The PGW 232 is communicatively coupled with the SGW 226 by an S5 reference point to facilitate user plane tunneling and tunnel management. The PGW 232 may further include a node for policy enforcement and charging data collection (e.g., PCEF). Additionally, the SGi reference point may communicatively couple the PGW 232 with the same or different data network 236. The PGW 232 may be communicatively coupled with a PCRF 234 via a Gx reference point.

The PCRF 234 is the policy and charging control element of the EPC 222. The PCRF 234 is communicatively coupled to the app/content server 238 to determine appropriate QoS and charging parameters for service flows. The PCRF 232 also provisions associated rules into a PCEF (via Gx reference point) with appropriate TFT and QCI.

The CN 220 may be a 5GC 240 including an AUSF 242, AMF 244, SMF 246, UPF 248, NSSF 250, NEF 252, NRF 254, PCF 256, UDM 258, and AF 260 coupled with one another over various interfaces as shown. The NFs in the 5GC 240 are briefly introduced as follows.

The AUSF 242 stores data for authentication of UE 202 and handle authentication-related functionality. The AUSF 242 may facilitate a common authentication framework for various access types.

The AMF 244 allows other functions of the 5GC 240 to communicate with the UE 202 and the RAN 204 and to subscribe to notifications about mobility events with respect to the UE 202. The AMF 244 is also responsible for registration management (e.g., for registering UE 202), connection management, reachability management, mobility management, lawful interception of AMF-related events, and access authentication and authorization. The AMF 244 provides transport for SM messages between the UE 202 and the SMF 246, and acts as a transparent proxy for routing SM messages. AMF 244 also provides transport for SMS messages between UE 202 and an SMSF. AMF 244 interacts with the AUSF 242 and the UE 202 to perform various security anchor and context management functions. Furthermore, AMF 244 is a termination point of a RAN-CP interface, which includes the N2 reference point between the RAN 204 and the AMF 244. The AMF 244 is also a termination point of NAS (N1) signaling, and performs NAS ciphering and integrity protection.

AMF 244 also supports NAS signaling with the UE 202 over an N3IWF interface. The N3IWF provides access to untrusted entities. N3IWF may be a termination point for the N2 interface between the (R)AN 204 and the AMF 244 for the control plane, and may be a termination point for the N3 reference point between the (R)AN 214 and the 248 for the user plane. As such, the AMF 244 handles N2 signalling from the SMF 246 and the AMF 244 for PDU sessions and QoS, encapsulate/de-encapsulate packets for IPSec and N3 tunnelling, marks N3 user-plane packets in the uplink, and enforces QoS corresponding to N3 packet marking taking into account QoS requirements associated with such marking received over N2. N3IWF may also relay UL and DL control-plane NAS signalling between the UE 202 and AMF 244 via an N1 reference point between the UE 202 and the AMF 244, and relay uplink and downlink user-plane packets between the UE 202 and UPF 248. The N3IWF also provides mechanisms for IPsec tunnel establishment with the UE 202. The AMF 244 may exhibit an Namf service-based interface, and may be a termination point for an N14 reference point between two AMFs 244 and an N17 reference point between the AMF 244 and a 5G-EIR (not shown by FIG. 2).

The SMF 246 is responsible for SM (e.g., session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM refers to management of a PDU session, and a PDU session or "session" refers to a PDU connectivity service that provides or enables the exchange of PDUs between the UE 202 and the DN 236.

The UPF 248 acts as an anchor point for intra-RAT and inter-RAT mobility, an external PDU session point of interconnect to data network 236, and a branching point to support multi-homed PDU session. The UPF 248 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 248 may include an uplink classifier to support routing traffic flows to a data network.

The NSSF 250 selects a set of network slice instances serving the UE 202. The NSSF 250 also determines allowed NSSAI and the mapping to the subscribed S-NSSAIs, if needed. The NSSF 250 also determines an AMF set to be used to serve the UE 202, or a list of candidate AMFs 244 based on a suitable configuration and possibly by querying the NRF 254. The selection of a set of network slice instances for the UE 202 may be triggered by the AMF 244 with which the UE 202 is registered by interacting with the NSSF 250; this may lead to a change of AMF 244. The NSSF 250 interacts with the AMF 244 via an N22 reference point; and may communicate with another NSSF in a visited network via an N31 reference point (not shown).

The NEF 252 securely exposes services and capabilities provided by 3GPP NFs for third party, internal exposure/re-exposure, AFs 260, edge computing or fog computing systems (e.g., edge compute node, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on exposed capabilities of other NFs. This information may be stored at the NEF 252 as structured data, or at a data storage NF using standardized interfaces. The stored information can then be re-exposed by the NEF 252 to other NFs and AFs, or used for other purposes such as analytics.

The NRF 254 supports service discovery functions, receives NF discovery requests from NF instances, and provides information of the discovered NF instances to the requesting NF instances. NRF 254 also maintains information of available NF instances and their supported services. The NRF 254 also supports service discovery functions, wherein the NRF 254 receives NF Discovery Request from NF instance or an SCP (not shown), and provides information of the discovered NF instances to the NF instance or SCP.

The PCF 256 provides policy rules to control plane functions to enforce them, and may also support unified policy framework to govern network behavior. The PCF 256 may also implement a front end to access subscription information relevant for policy decisions in a UDR of the UDM 258. In addition to communicating with functions over reference points as shown, the PCF 256 exhibit an Npcf service-based interface.

The UDM 258 handles subscription-related information to support the network entities' handling of communication sessions, and stores subscription data of UE 202. For example, subscription data may be communicated via an N8 reference point between the UDM 258 and the AMF 244. The UDM 258 may include two parts, an application front end and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on.

Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

AF 260 provides application influence on traffic routing, provide access to NEF 252, and interact with the policy framework for policy control. The AF 260 may influence UPF 248 (re)selection and traffic routing. Based on operator deployment, when AF 260 is considered to be a trusted entity, the network operator may permit AF 260 to interact directly with relevant NFs. Additionally, the AF 260 may be used for edge computing implementations, The 5GC 240 may enable edge computing by selecting operator/3rd party services to be geographically close to a point that the UE 202 is attached to the network. This may reduce latency and load on the network. In edge computing implementations, the 5GC 240 may select a UPF 248 close to the UE 202 and execute traffic steering from the UPF 248 to DN 236 via the N6 interface. This may be based on the UE subscription data, UE location, and information provided by the AF 260, which allows the AF 260 to influence UPF (re)selection and traffic routing.

The data network (DN) 236 may represent various network operator services, Internet access, or third party services that may be provided by one or more servers including, for example, application (app)/content server 238. The DN 236 may be an operator external public, a private PDN, or an intra-operator packet data network, for example, for provision of IMS services. In this embodiment, the app server 238 can be coupled to an IMS via an S-CSCF or the I-CSCF. In some implementations, the DN 236 may represent one or more local area DNs (LADNs), which are DNs 236 (or DN names (DNNs)) that is/are accessible by a UE 202 in one or more specific areas. Outside of these specific areas, the UE 202 is not able to access the LADN/DN 236.

Additionally or alternatively, the DN 236 may be an Edge DN 236, which is a (local) Data Network that supports the architecture for enabling edge applications. In these embodiments, the app server 238 may represent the physical hardware systems/devices providing app server functionality and/or the application software resident in the cloud or at an edge compute node that performs server function(s). In some embodiments, the app/content server 238 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 210, 214. For example, the edge compute nodes can provide a connection between the RAN 214 and UPF 248 in the 5GC 240. The edge compute nodes can use one or more NFV instances instantiated on virtualization infrastructure within the edge compute nodes to process wireless connections to and from the RAN 214 and UPF 248.

The interfaces of the 5GC 240 include reference points and service-based interfaces. The reference points include: N1 (between the UE 202 and the AMF 244), N2 (between RAN 214 and AMF 244), N3 (between RAN 214 and UPF 248), N4 (between the SMF 246 and UPF 248), N5 (between PCF 256 and AF 260), N6 (between UPF 248 and DN 236), N7 (between SMF 246 and PCF 256), N8 (between UDM 258 and AMF 244), N9 (between two UPFs 248), N10 (between the UDM 258 and the SMF 246), N11 (between the AMF 244 and the SMF 246), N12 (between AUSF 242 and AMF 244), N13 (between AUSF 242 and UDM 258), N14 (between two AMFs 244; not shown), N15 (between PCF 256 and AMF 244 in case of a non-roaming scenario, or between the PCF 256 in a visited network and AMF 244 in case of a roaming scenario), N16 (between two SMFs 246; not shown), and N22 (between AMF 244 and NSSF 250). Other reference point representations not shown in FIG. 2 can also be used. The service-based representation of FIG. 2 represents NFs within the control plane that enable other authorized NFs to access their services. The service-based interfaces (SBIs) include: Namf (SBI exhibited by AMF 244), Nsmf (SBI exhibited by SMF 246), Nnef (SBI exhibited by NEF 252), Npcf (SBI exhibited by PCF 256), Nudm (SBI exhibited by the UDM 258), Naf (SBI exhibited by AF 260), Nnrf (SBI exhibited by NRF 254), Nnssf (SBI exhibited by NSSF 250), Nausf (SBI exhibited by AUSF 242). Other service-based interfaces (e.g., Nudr, N5g-eir, and Nudsf) not shown in FIG. 2 can also be used. In some embodiments, the NEF 252 can provide an interface to edge compute nodes 236*x*, which can be used to process wireless connections with the RAN 214. In some implementations, the system 200 may include an SMSF, which is responsible for SMS subscription checking and verification, and relaying SM messages to/from the UE 202 to/from other entities, such as an SMS-GMSC/IWMSC/SMS-router. The SMS may also interact with AMF 244 and UDM 258 for a notification procedure that the UE 202 is available for SMS transfer (e.g., set a UE not reachable flag, and notifying UDM 258 when UE 202 is available for SMS).

The 5GS may also include an SCP (or individual instances of the SCP) that supports indirect communication (see e.g., 3GPP TS 23.501 section 7.1.1); delegated discovery (see e.g., 3GPP TS 23.501 section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., 3GPP TS 23.501 section 6.3). Load balancing, monitoring, overload control functionality provided by the SCP may be implementation specific. The SCP may be deployed in a distributed manner More than one SCP can be present in the communication path between various NF Services. The SCP, although not an NF instance, can also be deployed distributed, redundant, and scalable.

FIG. 3 schematically illustrates a wireless network 300 in accordance with various embodiments. The wireless network 300 may include a UE 302 in wireless communication with an AN 304. The UE 302 and AN 304 may be similar to, and substantially interchangeable with, like-named components described with respect to FIG. 2.

The UE 302 may be communicatively coupled with the AN 304 via connection 306. The connection 306 is illustrated as an air interface to enable communicative coupling, and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more of layer operations to facilitate transmission or reception of data over the connection 306. The layer operations implemented by the protocol processing circuitry 314 may include, for example, MAC, RLC, PDCP, RRC and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ acknowledgement (ACK) functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 314 may include one or more instances of control circuitry (not shown) to provide control functions for the transmit/receive components.

A UE 302 reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE 302 transmission may be established by and via the protocol processing circuitry 314, digital baseband circuitry 316, transmit circuitry 318, RF circuitry 322, RFFE 324, and antenna panels 326. In some embodiments, the transmit components of the UE 304 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 308 may perform various logical functions that include, for example, RNC functions such as radio bearer management, uplink and downlink dynamic radio resource management, and data packet FIG. 4 illustrates components of a computing device 400 according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 401 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 401.

The processors 410 include, for example, processor 412 and processor 414. The processors 410 include circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. The processors 410 may be, for example, a central processing unit (CPU), reduced instruction set computing (RISC) processors, Acorn RISC Machine (ARM) processors, complex instruction set computing (CISC) processors, graphics processing units (GPUs), one or more Digital Signal Processors (DSPs) such as a baseband processor, Application-Specific Integrated Circuits (ASICs), an Field-Programmable Gate Array (FPGA), a radio-frequency integrated circuit (RFIC), one or more microprocessors or controllers, another processor (including those discussed herein), or any suitable combination thereof. In some implementations, the processor circuitry 410 may include one or more hardware accelerators, which may be microprocessors, programmable processing devices (e.g., FPGA, complex programmable logic devices (CPLDs), etc.), or the like.

The memory/storage devices 420 may include main memory, disk storage, or any suitable combination thereof. The memory/storage devices 420 may include, but are not limited to, any type of volatile, non-volatile, or semi-volatile memory such as random access memory (RAM), dynamic RAM (DRAM), static RAM (SRAM), synchronous DRAM (SDRAM), erasable programmable read-only memory (EPROM), electrically erasable programmable read-only memory (EEPROM), Flash memory, solid-state storage, phase change RAM (PRAM), resistive memory such as magnetoresistive random access memory (MRAM), etc., and may incorporate three-dimensional (3D) cross-point (XPOINT) memories from Intel® and Micron®. The memory/storage devices 420 may also comprise persistent storage devices, which may be temporal and/or persistent storage of any type, including, but not limited to, non-volatile memory, optical, magnetic, and/or solid state mass storage, and so forth.

The communication resources 430 may include interconnection or network interface controllers, components, or other suitable devices to communicate with one or more peripheral devices 404 or one or more databases 406 or other network elements via a network 408. For example, the communication resources 430 may include wired communication components xx(e.g., for coupling via USB, Ethernet, Ethernet, Ethernet over GRE Tunnels, Ethernet over Multiprotocol Label Switching (MPLS), Ethernet over USB, Controller Area Network (CAN), Local Interconnect Network (LIN), DeviceNet, ControlNet, Data Highway+, PROFIBUS, or PROFINET, among many others), cellular communication components, NFC components, Bluetooth® (or Bluetooth® Low Energy) components, WiFi® components, and other communication components. Network connectivity may be provided to/from the computing device 400 via the communication resources 430 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The communication resources 430 may include one or more dedicated processors and/or FPGAs to communicate using one or more of the aforementioned network interface protocols.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 401 from any combination of the peripheral devices 404 or the databases 406. Accordingly, the memory of processors 410, the memory/storage devices 420, the peripheral devices 404, and the databases 406 are examples of computer-readable and machine-readable media.

Figure 7:
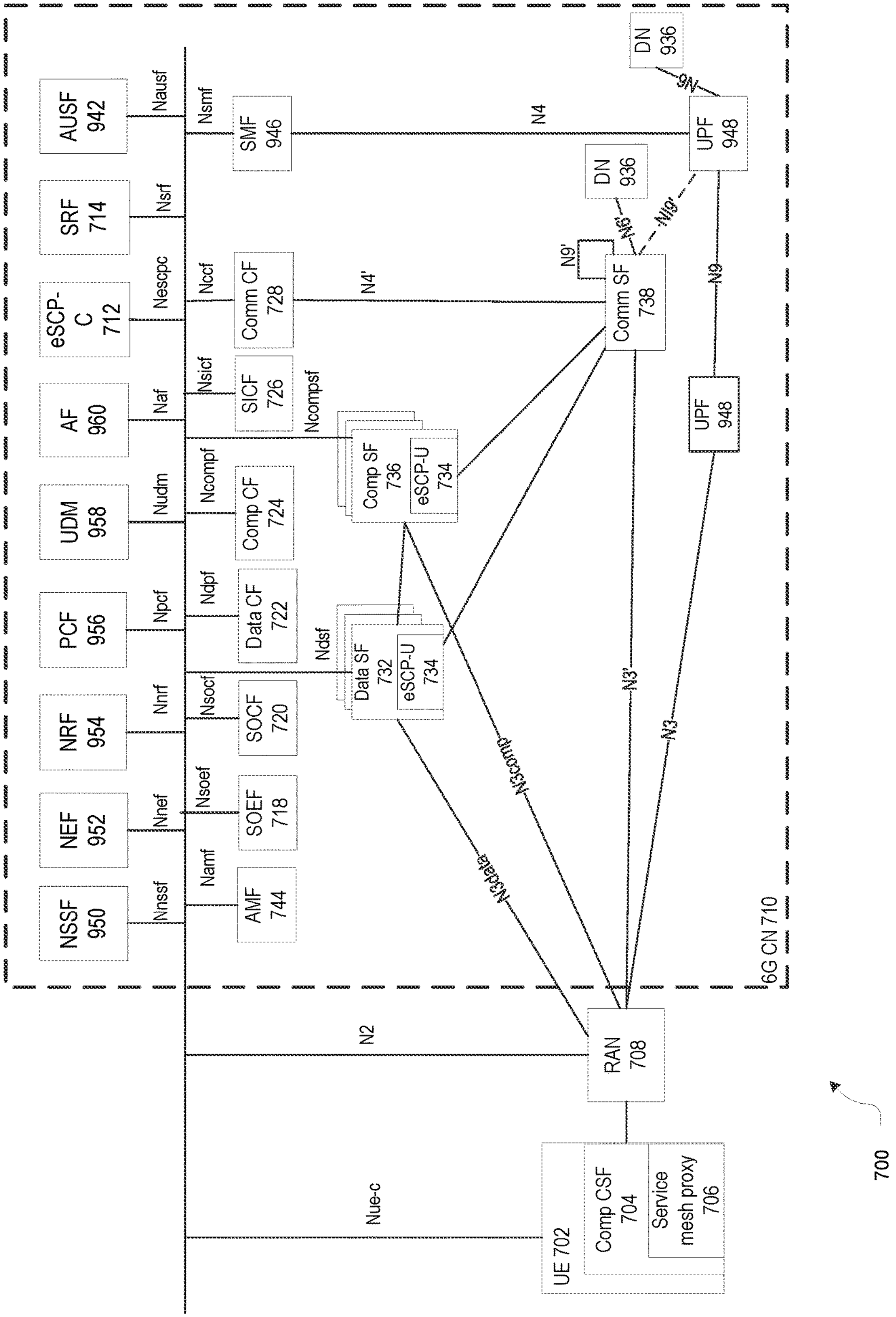
FIG. 7 illustrates an example Open RAN (O-RAN) system architecture.

FIG. 7 provides a high-level view of an Open RAN (O-RAN) architecture 700. The O-RAN architecture 700 includes four O-RAN defined interfaces—namely, the A1 interface, the O1 interface, the O2 interface, and the Open Fronthaul Management (M)-plane interface—which connect the Service Management and Orchestration (SMO) framework 702 to O-RAN network functions (NFs) 704 and the O-Cloud 706. The SMO 702 (described in [O13]) also connects with an external system 710, which provides enrichment data to the SMO 702. FIG. 7 also illustrates that the A1 interface terminates at an O-RAN Non-Real Time (RT) RAN Intelligent Controller (RIC) 712 in or at the SMO 702 and at the O-RAN Near-RT RIC 714 in or at the O-RAN NFs 704. The O-RAN NFs 704 can be VNFs such as VMs or containers, sitting above the O-Cloud 706 and/or Physical Network Functions (PNFs) utilizing customized hardware. All O-RAN NFs 704 are expected to support the O1 interface when interfacing the SMO framework 702. The O-RAN NFs 704 connect to the NG-Core 708 via the NG interface (which is a 3GPP defined interface). The Open Fronthaul M-plane interface between the SMO 702 and the O-RAN Radio Unit (O-RU) 716 supports the O-RU 716 management in the O-RAN hybrid model as specified in [O16]. The Open Fronthaul M-plane interface is an optional interface to the SMO 702 that is included for backward compatibility purposes as per [O16], and is intended for management of the O-RU 716 in hybrid mode only. The management architecture of flat mode and its relation to the O1 interface for the O-RU 716 is for future study. The O-RU 716 termination of the O1 interface towards the SMO 702 as specified in [O12].

Figure 8:
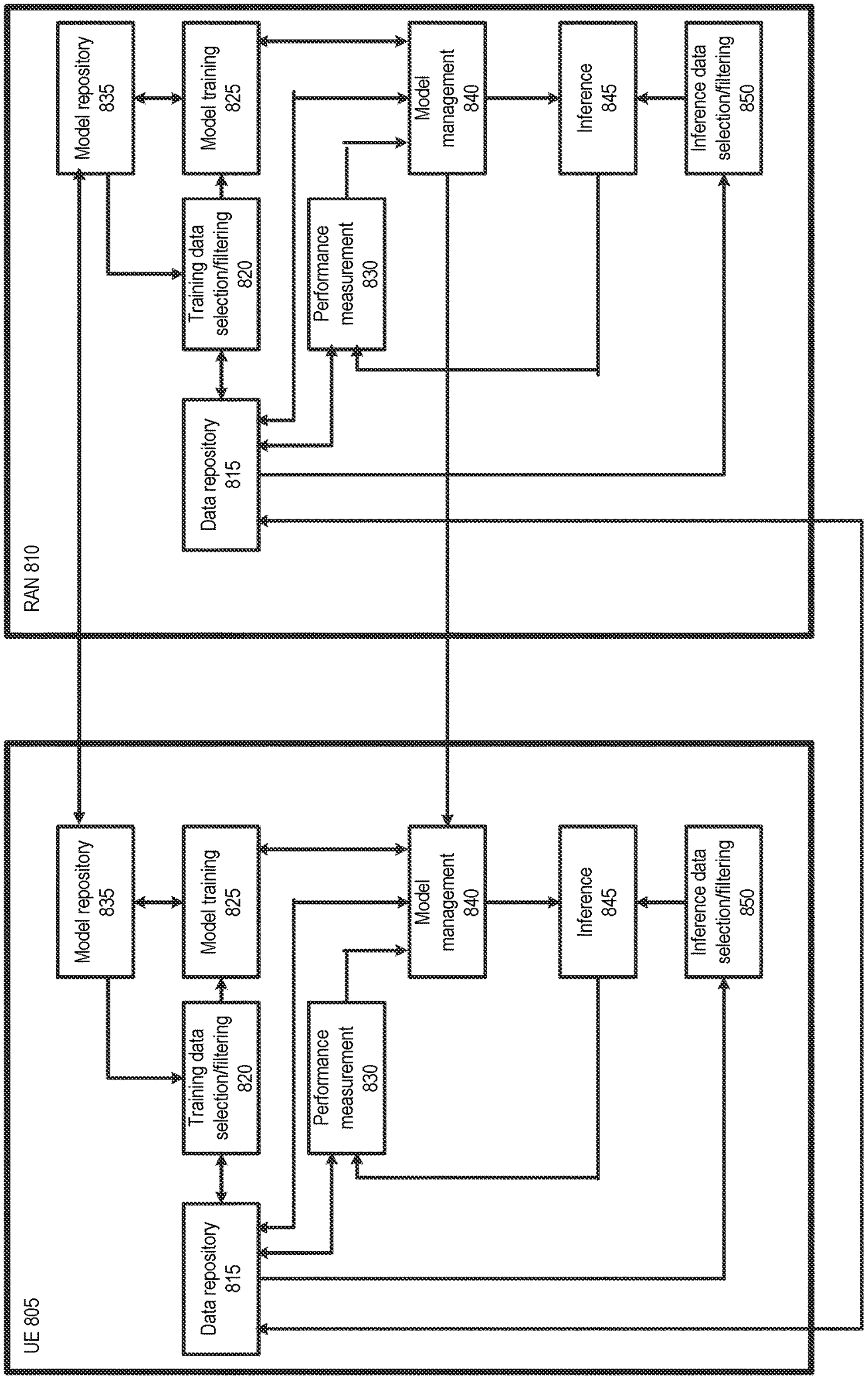
FIG. 8 illustrates a logical architecture of the O-RAN system of FIG. 7.

FIG. 8 shows an O-RAN logical architecture 800 corresponding to the O-RAN architecture 700 of FIG. 7. In FIG. 8, the SMO 802 corresponds to the SMO 702, O-Cloud 806 corresponds to the O-Cloud 706, the non-RT RIC 812 corresponds to the non-RT RIC 712, the Near-RT RIC 814 corresponds to the Near-RT RIC 714, and the O-RU 816 corresponds to the O-RU 716 of FIG. 8, respectively. The O-RAN logical architecture 800 includes a radio portion and a management portion.

The management portion/side of the architectures 800 includes the SMO Framework 802 containing the non-RT RIC 812, and may include the O-Cloud 806. The O-Cloud 806 is a cloud computing platform including a collection of physical infrastructure nodes to host the relevant O-RAN functions (e.g., the Near-RT RIC 814, O-CU-CP 821, O-CU-UP 822, and the O-DU 815), supporting software components (e.g., OSs, VMMs, container runtime engines, ML engines, etc.), and appropriate management and orchestration functions.

The radio portion/side of the logical architecture 800 includes the Near-RT RIC 814, the O-RAN Distributed Unit (O-DU) 815, the O-RU 816, the O-RAN Central Unit—Control Plane (O-CU-CP) 821, and the O-RAN Central Unit—User Plane (O-CU-UP) 822 functions. The radio portion/side of the logical architecture 800 may also include the O-e/gNB 810.

The O-DU 815 is a logical node hosting RLC, MAC, and higher PHY layer entities/elements (High-PHY layers) based on a lower layer functional split. The O-RU 816 is a logical node hosting lower PHY layer entities/elements (Low-PHY layer) (e.g., FFT/iFFT, PRACH extraction, etc.) and RF processing elements based on a lower layer functional split. Virtualization of O-RU 816 is FFS. The O-CU-CP 821 is a logical node hosting the RRC and the control plane (CP) part of the PDCP protocol. The O O-CU-UP 822 is a a logical node hosting the user plane part of the PDCP protocol and the SDAP protocol.

An E2 interface terminates at a plurality of E2 nodes. The E2 nodes are logical nodes/entities that terminate the E2 interface. For NR/5G access, the E2 nodes include the O-CU-CP 821, O-CU-UP 822, O-DU 815, or any combination of elements as defined in [O15]. For E-UTRA access the E2 nodes include the O-e/gNB 810. As shown in FIG. 8, the E2 interface also connects the O-e/gNB 810 to the Near-RT RIC 814. The protocols over E2 interface are based exclusively on Control Plane (CP) protocols. The E2 functions are grouped into the following categories: (a) Near-RT RIC 814 services (REPORT, INSERT, CONTROL and POLICY, as described in [O15]); and (b) Near-RT RIC 814 support functions, which include E2 Interface Management (E2 Setup, E2 Reset, Reporting of General Error Situations, etc.) and Near-RT RIC Service Update (e.g., capability exchange related to the list of E2 Node functions exposed over E2). Each E2 node operates as an O-RAN Network Function (NF), effectively terminating the E2 interface. This broadens the scope and functionality within the O-RAN architecture, leveraging the capabilities of both O-CU and O-DU for optimized network performance and interface management.

FIG. 8 shows the Uu interface between a UE 801 and O-e/gNB 810 as well as between the UE 801 and O-RAN components. The Uu interface is a 3GPP defined interface (see e.g., sections 5.2 and 5.3 of [O07]), which includes a complete protocol stack from L1 to L3 and terminates in the NG-RAN or E-UTRAN. The O-e/gNB 810 is an LTE eNB [O04], a 5G gNB or ng-eNB that supports the E2 interface. The O-e/gNB 810 may be the same or similar as eNB 212, gNB 216, ng-eNB 218, RAN 508, RAN 610, or some other base station, RAN, or nodeB discussed previously. The a UE 801 may correspond to UEs 202, 302, 502, UE 605, or some other UE discussed with respect to other Figures herein, and/or the like. There may be multiple UEs 801 and/or multiple O-e/gNB 810, each of which may be connected to one another the via respective Uu interfaces. Although not shown in FIG. 8, the O-e/gNB 810 supports O-DU 815 and O-RU 816 functions with an Open Fronthaul interface between them.

The Open Fronthaul (OF) interface(s) is/are between O-DU 815 and O-RU 816 functions [O16] [O17]. The OF interface(s) includes the Control User Synchronization (CUS) Plane and Management (M) Plane. FIGS. 7 and 8 also show that the O-RU 816 terminates the OF M-Plane interface towards the O-DU 815 and optionally towards the SMO 802 as specified in [O16]. The O-RU 816 terminates the OF CUS-Plane interface towards the O-DU 815 and the SMO 802.

The F1-c interface connects the O-CU-CP 821 with the O-DU 815. As defined by 3GPP, the F1-c interface is between the gNB-CU-CP and gNB-DU nodes [O07] [O10]. However, for purposes of O-RAN, the F1-c interface is adopted between the O-CU-CP 821 with the O-DU 815 functions while reusing the principles and protocol stack defined by 3GPP and the definition of interoperability profile specifications.

The F1-u interface connects the O-CU-UP 822 with the O-DU 815. As defined by 3GPP, the F1-u interface is between the gNB-CU-UP and gNB-DU nodes [O10]. However, for purposes of O-RAN, the F1-u interface is adopted between the O-CU-UP 822 with the O-DU 815 functions while reusing the principles and protocol stack defined by 3GPP and the definition of interoperability profile specifications.

The NG-c interface is defined by 3GPP as an interface between the gNB-CU-CP and the AMF in the 5GC [O06]. The NG-c is also referred as the N2 interface (see [O06]). The NG-u interface is defined by 3GPP, as an interface between the gNB-CU-UP and the UPF in the 5GC [O06]. The NG-u interface is referred as the N3 interface (see [O06]). In O-RAN, NG-c and NG-u protocol stacks defined by 3GPP are reused and may be adapted for O-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC (see e.g., [O05], [O06]). In O-RAN, X2-c and X2-u protocol stacks defined by 3GPP are reused and may be adapted for O-RAN purposes The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB (see e.g., [O06], [O08]). In O-RAN, Xn-c and Xn-u protocol stacks defined by 3GPP are reused and may be adapted for O-RAN purposes The E1 interface is defined by 3GPP as being an interface between the gNB-CU-CP (e.g., gNB-CU-CP 3728) and gNB-CU-UP (see e.g., [O07], [O09]). In O-RAN, E1 protocol stacks defined by 3GPP are reused and adapted as being an interface between the O-CU-CP 821 and the O-CU-UP 822 functions.

The O-RAN Non-Real Time (RT) RAN Intelligent Controller (RIC) 812 is a logical function within the SMO framework 702, 802 that enables non-real-time control and optimization of RAN elements and resources; AI/machine learning (ML) workflow(s) including model training, inferences, and updates; and policy-based guidance of applications/features in the Near-RT RIC 814.

The O-RAN Near-RT RIC 814 is a logical function that enables near-real-time control and optimization of RAN elements and resources via fine-grained data collection and actions over the E2 interface. The Near-RT RIC 814 may include one or more AI/ML workflows including model training, inferences, and updates.

The non-RT RIC 812 can be an ML training host to host the training of one or more ML models. ML training can be performed offline using data collected from the RIC, O-DU 815 and O-RU 816. For supervised learning, non-RT RIC 812 is part of the SMO 802, and the ML training host and/or ML model host/actor can be part of the non-RT RIC 812 and/or the Near-RT RIC 814. For unsupervised learning, the ML training host and ML model host/actor can be part of the non-RT RIC 812 and/or the Near-RT RIC 814. For reinforcement learning, the ML training host and ML model host/actor may be co-located as part of the non-RT RIC 812 and/or the Near-RT RIC 814. In some implementations, the non-RT RIC 812 may request or trigger ML model training in the training hosts regardless of where the model is deployed and executed. ML models may be trained and not currently deployed.

In some implementations, the non-RT RIC 812 provides a query-able catalog for an ML designer/developer to publish/install trained ML models (e.g., executable software components). In these implementations, the non-RT RIC 812 may provide discovery mechanism if a particular ML model can be executed in a target ML inference host (MF), and what number and type of ML models can be executed in the MF. For example, there may be three types of ML catalogs made discoverable by the non-RT RIC 812: a design-time catalog (e.g., residing outside the non-RT RIC 812 and hosted by some other ML platform(s)), a training/deployment-time catalog (e.g., residing inside the non-RT RIC 812), and a run-time catalog (e.g., residing inside the non-RT RIC 812). The non-RT RIC 812 supports necessary capabilities for ML model inference in support of ML assisted solutions running in the non-RT RIC 812 or some other ML inference host. These capabilities enable executable software to be installed such as VMs, containers, etc. The non-RT RIC 812 may also include and/or operate one or more ML engines, which are packaged software executable libraries that provide methods, routines, data types, etc., used to run ML models. The non-RT RIC 812 may also implement policies to switch and activate ML model instances under different operating conditions.

The non-RT RIC 82 is be able to access feedback data (e.g., FM and PM statistics) over the O1 interface on ML model performance and perform necessary evaluations. If the ML model fails during runtime, an alarm can be generated as feedback to the non-RT RIC 812. How well the ML model is performing in terms of prediction accuracy or other operating statistics it produces can also be sent to the non-RT RIC 812 over O1. The non-RT RIC 812 can also scale ML model instances running in a target MF over the O1 interface by observing resource utilization in MF. The environment where the ML model instance is running (e.g., the MF) monitors resource utilization of the running ML model. This can be done, for example, using an ORAN-SC component called ResourceMonitor in the Near-RT RIC 814 and/or in the non-RT RIC 812, which continuously monitors resource utilization. If resources are low or fall below a certain threshold, the runtime environment in the Near-RT RIC 814 and/or the non-RT RIC 812 provides a scaling mechanism to add more ML instances. The scaling mechanism may include a scaling factor such as an number, percentage, and/or other like data used to scale up/down the number of ML instances. ML model instances running in the target ML inference hosts may be automatically scaled by observing resource utilization in the MF. For example, the Kubernetes® (K8s) runtime environment typically provides an auto-scaling feature.

The A1 interface is between the non-RT RIC 812 (within or outside the SMO 802) and the Near-RT RIC 814. The A1 interface supports three types of services as defined in [O14], including a Policy Management Service, an Enrichment Information Service, and ML Model Management Service. A1 policies have the following characteristics compared to persistent configuration [O14]: A1 policies are not critical to traffic; A1 policies have temporary validity; A1 policies may handle individual UE or dynamically defined groups of UEs; A1 policies act within and take precedence over the configuration; and A1 policies are non-persistent, i.e., do not survive a restart of the Near-RT RIC.

[O04] 3GPP TS 36.401 v15.1.0 (2019 Jan. 9).
[O05] 3GPP TS 36.420 v15.2.0 (2020 Jan. 9).
[O06] 3GPP TS 38.300 v16.0.0 (2020 Jan. 8).
[O07] 3GPP TS 38.401 v16.0.0 (2020 Jan. 9).
[O08] 3GPP TS 38.420 v15.2.0 (2019 Jan. 8).
[O09] 3GPP TS 38.460 v16.0.0 (2020 Jan. 9).
[O10] 3GPP TS 38.470 v16.0.0 (2020 Jan. 9).
[O12] O-RAN Alliance Working Group 1, 0-RAN Operations and Maintenance Architecture Specification, version 2.0 (December 2019) ("O-RAN-WG1.OAM-Architecture-v02.00").
[O13] O-RAN Alliance Working Group 1, 0-RAN Operations and Maintenance Interface Specification, version 2.0 (December 2019) ("O-RAN-WG1.01-Interface-v02.00").
[O14] O-RAN Alliance Working Group 2, 0-RAN A1 interface: General Aspects and Principles Specification, version 1.0 (October 2019) ("ORAN-WG2.ALGA&P-v01.00").
[O15] O-RAN Alliance Working Group 3, Near-Real-time RAN Intelligent Controller Architecture & E2 General Aspects and Principles ("ORAN-WG3.E2GAP.0-v0.1").
[O16] O-RAN Alliance Working Group 4, 0-RAN Fronthaul Management Plane Specification, version 2.0 (July 2019) ("ORAN-WG4.MP.0-v02.00.00").
[O17] O-RAN Alliance Working Group 4, 0-RAN Fronthaul Control, User and Synchronization Plane Specification, version 2.0 (July 2019) ("ORAN-WG4.CUS.0-v02.00").

Figure 5:
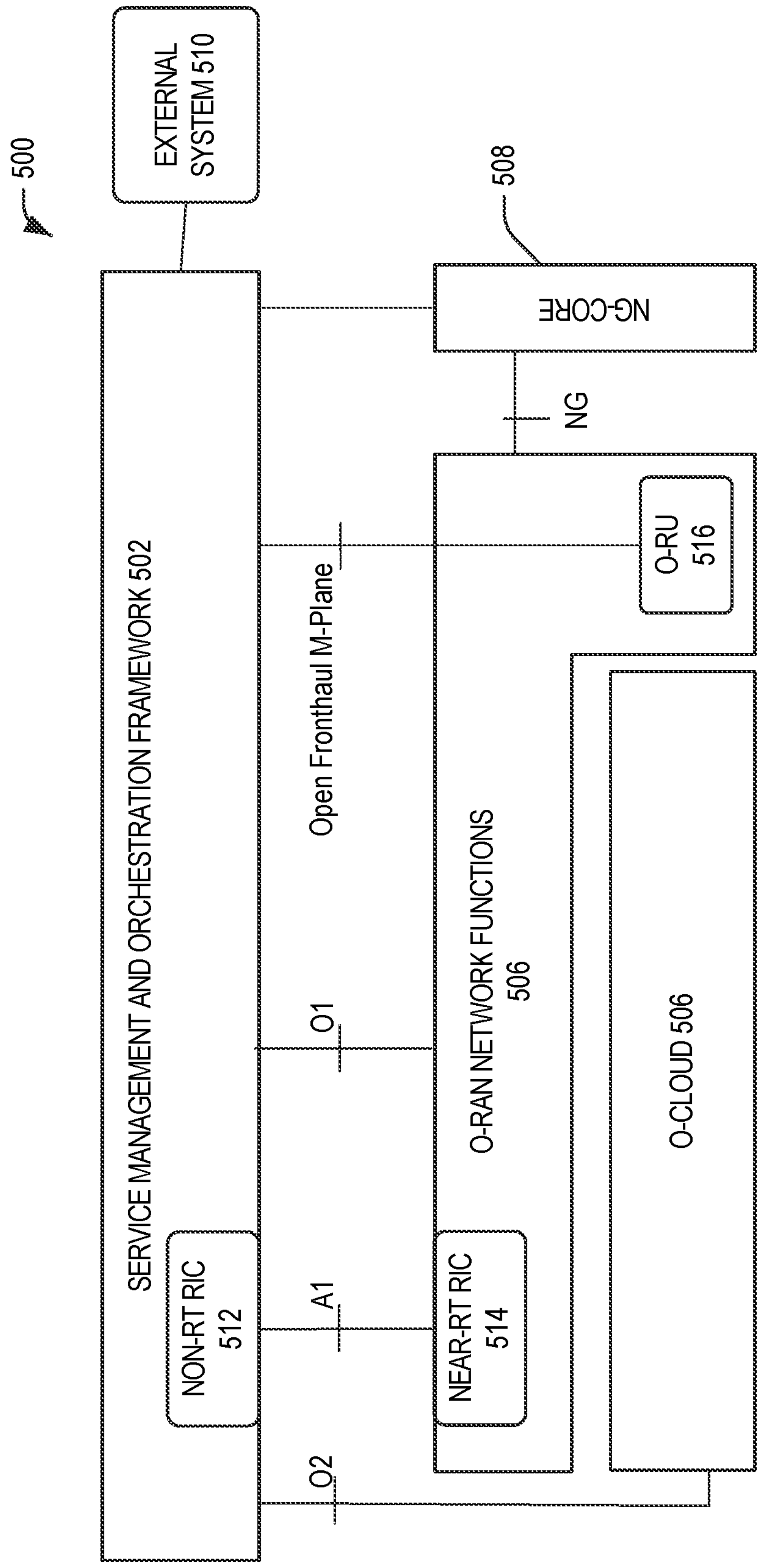
FIG. 5 illustrates a network 500 in accordance with various embodiments.

FIG. 5 illustrates a network 500 in accordance with various embodiments. The network 500 may operate in a matter consistent with 3GPP technical specifications or technical reports for 6G systems. In some embodiments, the network 500 may operate concurrently with network 200. For example, in some embodiments, the network 500 may share one or more frequency or bandwidth resources with network 200. As one specific example, a UE (e.g., UE 502) may be configured to operate in both network 500 and network 200. Such configuration may be based on a UE including circuitry configured for communication with frequency and bandwidth resources of both networks 200 and 500. In general, several elements of network 500 may share one or more characteristics with elements of network 200. For the sake of brevity and clarity, such elements may not be repeated in the description of network 500.

The network 500 may include a UE 502, which may include any mobile or non-mobile computing device designed to communicate with a RAN 508 via an over-the-air connection. The UE 502 may be similar to, for example, UE 202. The UE 502 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

Although not specifically shown in FIG. 5, in some embodiments the network 500 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc. Similarly, although not specifically shown in FIG. 5, the UE 502 may be communicatively coupled with an AP such as AP 206 as described with respect to FIG. 2. Additionally, although not specifically shown in FIG. 5, in some embodiments the RAN 508 may include one or more ANss such as AN 208 as described with respect to FIG. 2. The RAN 508 and/or the AN of the RAN 508 may be referred to as a base station (BS), a RAN node, or using some other term or name.

The UE 502 and the RAN 508 may be configured to communicate via an air interface that may be referred to as a sixth generation (6G) air interface. The 6G air interface may include one or more features such as communication in a terahertz (THz) or sub-THz bandwidth, or joint communication and sensing. As used herein, the term "joint communication and sensing" may refer to a system that allows for wireless communication as well as radar-based sensing via various types of multiplexing. As used herein, THz or sub-THz bandwidths may refer to communication in the 80 GHz and above frequency ranges. Such frequency ranges may additionally or alternatively be referred to as "millimeter wave" or "mmWave" frequency ranges.

The RAN 508 may allow for communication between the UE 502 and a 6G core network (CN) 510. Specifically, the RAN 508 may facilitate the transmission and reception of data between the UE 502 and the 6G CN 510. The 6G CN 510 may include various functions such as NSSF 250, NEF 252, NRF 254, PCF 256, UDM 258, AF 260, SMF 246, and AUSF 242. The 6G CN 510 may additional include UPF 248 and DN 236 as shown in FIG. 5.

Additionally, the RAN 508 may include various additional functions that are in addition to, or alternative to, functions of a legacy cellular network such as a 4G or 5G network. Two such functions may include a Compute Control Function (Comp CF) 524 and a Compute Service Function (Comp SF) 536. The Comp CF 524 and the Comp SF 536 may be parts or functions of the Computing Service Plane. Comp CF 524 may be a control plane function that provides functionalities such as management of the Comp SF 536, computing task context generation and management (e.g., create, read, modify, delete), interaction with the underlaying computing infrastructure for computing resource management, etc. Comp SF 536 may be a user plane function that serves as the gateway to interface computing service users (such as UE 502) and computing nodes behind a Comp SF instance. Some functionalities of the Comp SF 536 may include: parse computing service data received from users to compute tasks executable by computing nodes; hold service mesh ingress gateway or service API gateway; service and charging policies enforcement; performance monitoring and telemetry collection, etc. In some embodiments, a Comp SF 536 instance may serve as the user plane gateway for a cluster of computing nodes. A Comp CF 524 instance may control one or more Comp SF 536 instances.

Two other such functions may include a Communication Control Function (Comm CF) 528 and a Communication Service Function (Comm SF) 538, which may be parts of the Communication Service Plane. The Comm CF 528 may be the control plane function for managing the Comm SF 538, communication sessions creation/configuration/releasing, and managing communication session context. The Comm SF 538 may be a user plane function for data transport. Comm CF 528 and Comm SF 538 may be considered as upgrades of SMF 246 and UPF 248, which were described with respect to a 5G system in FIG. 2. The upgrades provided by the Comm CF 528 and the Comm SF 538 may enable service-aware transport. For legacy (e.g., 4G or 5G) data transport, SMF 246 and UPF 248 may still be used.

Two other such functions may include a Data Control Function (Data CF) 522 and Data Service Function (Data SF) 532 may be parts of the Data Service Plane. Data CF 522 may be a control plane function and provides functionalities such as Data SF 532 management, Data service creation/configuration/releasing, Data service context management, etc. Data SF 532 may be a user plane function and serve as the gateway between data service users (such as UE 502 and the various functions of the 6G CN 510) and data service endpoints behind the gateway. Specific functionalities may include: parse data service user data and forward to corresponding data service endpoints, generate charging data, report data service status.

Another such function may be the Service Orchestration and Chaining Function (SOCF) 520, which may discover, orchestrate and chain up communication/computing/data services provided by functions in the network. Upon receiving service requests from users, SOCF 520 may interact with one or more of Comp CF 524, Comm CF 528, and Data CF 522 to identify Comp SF 536, Comm SF 538, and Data SF 532 instances, configure service resources, and generate the service chain, which could contain multiple Comp SF 536, Comm SF 538, and Data SF 532 instances and their associated computing endpoints. Workload processing and data movement may then be conducted within the generated service chain. The SOCF 520 may also responsible for maintaining, updating, and releasing a created service chain.

Another such function may be the service registration function (SRF) 514, which may act as a registry for system services provided in the user plane such as services provided by service endpoints behind Comp SF 536 and Data SF 532 gateways and services provided by the UE 502. The SRF 514 may be considered a counterpart of NRF 254, which may act as the registry for network functions.

Other such functions may include an evolved service communication proxy (eSCP) and service infrastructure control function (SICF) 526, which may provide service communication infrastructure for control plane services and user plane services. The eSCP may be related to the service communication proxy (SCP) of 5G with user plane service communication proxy capabilities being added. The eSCP is therefore expressed in two parts: eCSP-C 512 and eSCP-U 534, for control plane service communication proxy and user plane service communication proxy, respectively. The SICF 526 may control and configure eCSP instances in terms of service traffic routing policies, access rules, load balancing configurations, performance monitoring, etc.

Another such function is the AMF 544. The AMF 544 may be similar to 244, but with additional functionality. Specifically, the AMF 544 may include potential functional repartition, such as move the message forwarding functionality from the AMF 544 to the RAN 508.

Another such function is the service orchestration exposure function (SOEF) 518. The SOEF may be configured to expose service orchestration and chaining services to external users such as applications.

The UE 502 may include an additional function that is referred to as a computing client service function (comp CSF) 504. The comp CSF 504 may have both the control plane functionalities and user plane functionalities, and may interact with corresponding network side functions such as SOCF 520, Comp CF 524, Comp SF 536, Data CF 522, and/or Data SF 532 for service discovery, request/response, compute task workload exchange, etc. The Comp CSF 504 may also work with network side functions to decide on whether a computing task should be run on the UE 502, the RAN 508, and/or an element of the 6G CN 510.

The UE 502 and/or the Comp CSF 504 may include a service mesh proxy 506. The service mesh proxy 506 may act as a proxy for service-to-service communication in the user plane. Capabilities of the service mesh proxy 506 may include one or more of addressing, security, load balancing, etc.

Figure 6:
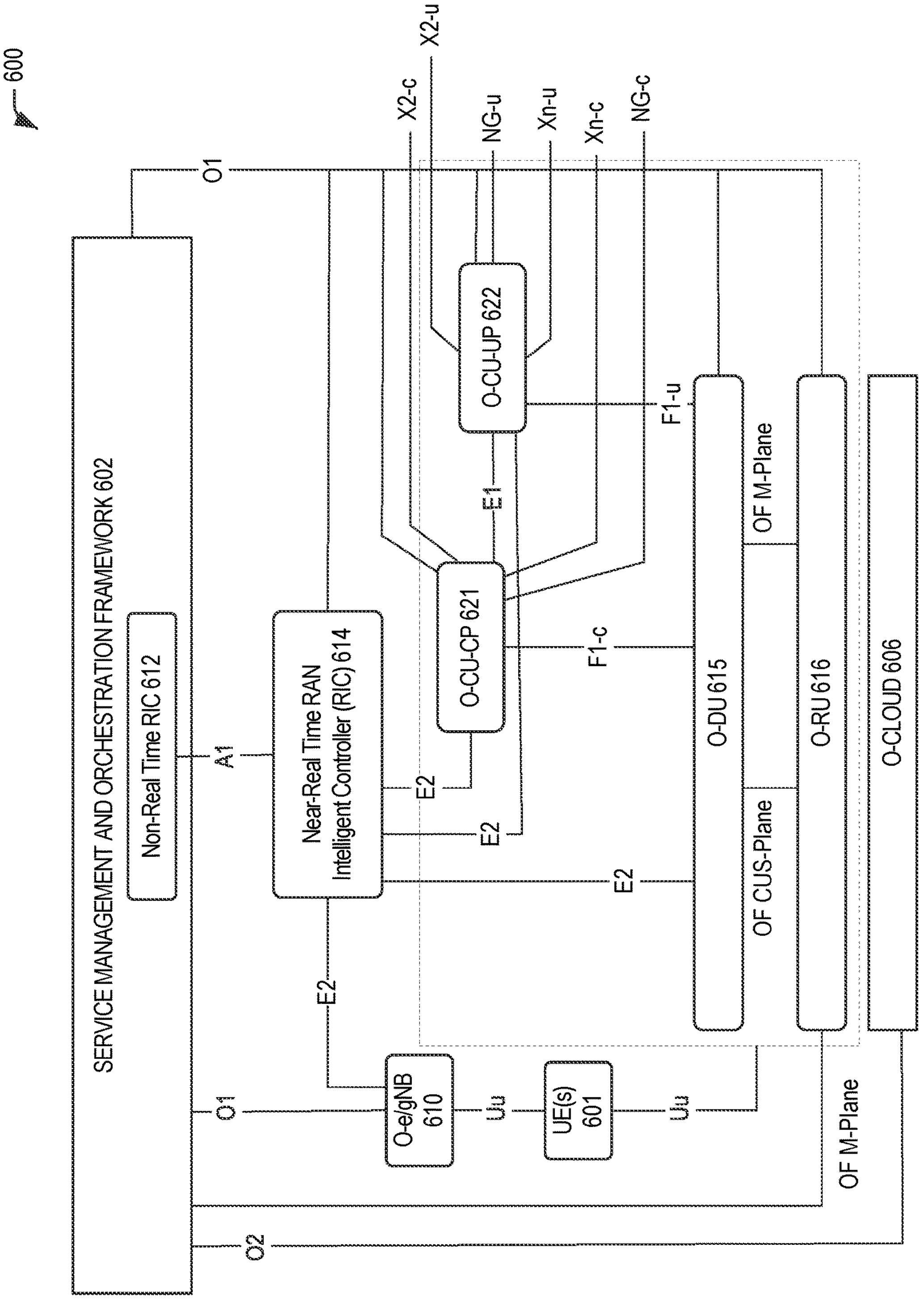
FIG. 6 illustrates a simplified block diagram of artificial (AI)-assisted communication between a user equipment (UE) and a radio access network (RAN), in accordance with various embodiments.

FIG. 6 illustrates a simplified block diagram of artificial (AI)-assisted communication between a UE 605 and a RAN 610, in accordance with various embodiments. More specifically, as described in further detail below, AI/machine learning (ML) models may be used or leveraged to facilitate over-the-air communication between UE 605 and RAN 610.

One or both of the UE 605 and the RAN 610 may operate in a matter consistent with 3GPP technical specifications or technical reports for 6G systems. In some embodiments, the wireless cellular communication between the UE 605 and the RAN 610 may be part of, or operate concurrently with, networks 500, 200, and/or some other network described herein.

The UE 605 may be similar to, and share one or more features with, UE 502, UE 202, and/or some other UE described herein. The UE 605 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc. The RAN 610 may be similar to, and share one or more features with, RAN 214, RAN 508, and/or some other RAN described herein.

As may be seen in FIG. 6, the AI-related elements of UE 605 may be similar to the AI-related elements of RAN 610. For the sake of discussion herein, description of the various elements will be provided from the point of view of the UE 605, however it will be understood that such discussion or description will apply to equally named/numbered elements of RAN 610, unless explicitly stated otherwise.

As previously noted, the UE 605 may include various elements or functions that are related to AI/ML. Such elements may be implemented as hardware, software, firmware, and/or some combination thereof. In embodiments, one or more of the elements may be implemented as part of the same hardware (e.g., chip or multi-processor chip), software (e.g., a computing program), or firmware as another element.

One such element may be a data repository 615. The data repository 615 may be responsible for data collection and storage. Specifically, the data repository 615 may collect and store RAN configuration parameters, measurement data, performance KPIs, model performance metrics, etc., for model training, update, and inference. More generally, collected data is stored into the repository. Stored data can be discovered and extracted by other elements from the data repository 615. For example, as may be seen, the inference data selection/filter element 650 may retrieve data from the data repository 615. In various embodiments, the UE 605 may be configured to discover and request data from the data repository 615 in the RAN, and vice versa. More generally, the data repository 615 of the UE 605 may be communicatively coupled with the data repository 615 of the RAN 610 such that the respective data repositories of the UE and the RAN may share collected data with one another.

Another such element may be a training data selection/filtering functional block 620. The training data selection/filter functional block 620 may be configured to generate training, validation, and testing datasets for model training. Training data may be extracted from the data repository 615. Data may be selected/filtered based on the specific AI/ML model to be trained. Data may optionally be transformed/augmented/pre-processed (e.g., normalized) before being loaded into datasets. The training data selection/filter functional block 620 may label data in datasets for supervised learning. The produced datasets may then be fed into model training the model training functional block 625.

As noted above, another such element may be the model training functional block 625. This functional block may be responsible for training and updating(re-training) AI/ML models. The selected model may be trained using the fed-in datasets (including training, validation, testing) from the training data selection/filtering functional block. The model training functional block 625 may produce trained and tested AI/ML models which are ready for deployment. The produced trained and tested models can be stored in a model repository 635.

The model repository 635 may be responsible for AI/ML models' (both trained and un-trained) storage and exposure. Trained/updated model(s) may be stored into the model repository 635. Model and model parameters may be discovered and requested by other functional blocks (e.g., the training data selection/filter functional block 620 and/or the model training functional block 625). In some embodiments, the UE 605 may discover and request AI/ML models from the model repository 635 of the RAN 610 Similarly, the RAN 610 may be able to discover and/or request AI/ML models from the model repository 635 of the UE 605. In some embodiments, the RAN 610 may configure models and/or model parameters in the model repository 635 of the UE 605.

Another such element may be a model management functional block 640. The model management functional block 640 may be responsible for management of the AI/ML model produced by the model training functional block 625. Such management functions may include deployment of a trained model, monitoring model performance, etc. In model deployment, the model management functional block 640 may allocate and schedule hardware and/or software resources for inference, based on received trained and tested models. As used herein, "inference" refers to the process of using trained AI/ML model(s) to generate data analytics, actions, policies, etc. based on input inference data. In performance monitoring, based on wireless performance KPIs and model performance metrics, the model management functional block 640 may decide to terminate the running model, start model re-training, select another model, etc. In embodiments, the model management functional block 640 of the RAN 610 may be able to configure model management policies in the UE 605 as shown.

Another such element may be an inference data selection/filtering functional block 650. The inference data selection/filter functional block 650 may be responsible for generating datasets for model inference at the inference functional block 645, as described below. Specifically, inference data may be extracted from the data repository 615. The inference data selection/filter functional block 650 may select and/or filter the data based on the deployed AI/ML model. Data may be transformed/augmented/pre-processed following the same transformation/augmentation/pre-processing as those in training data selection/filtering as described with respect to functional block 620. The produced inference dataset may be fed into the inference functional block 645.

Another such element may be the inference functional block 645. The inference functional block 645 may be responsible for executing inference as described above. Specifically, the inference functional block 645 may consume the inference dataset provided by the inference data selection/filtering functional block 650, and generate one or more outcomes. Such outcomes may be or include data analytics, actions, policies, etc. The outcome(s) may be provided to the performance measurement functional block 630.

The performance measurement functional block 630 may be configured to measure model performance metrics (e.g., accuracy, model bias, run-time latency, etc.) of deployed and executing models based on the inference outcome(s) for monitoring purpose. Model performance data may be stored in the data repository 615.

Multiple Dependency

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Additional examples of the presently described embodiments include the following, non-limiting implementations. Each of the following non-limiting examples may stand on its own or may be combined in any permutation or combination with any one or more of the other examples provided below or throughout the present disclosure.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below.

The following examples pertain to further embodiments.

Example 1 may include an apparatus comprising generate radio access network (RAN) measurement parameters to configure an E2 node in Open Radio Access Network (O-RAN); transmit an action definition to the E2 node through an E2 interface, wherein the action definition comprises a measured value reporting conditions information element (IE) based on the RAN measurement parameters, indicating to the E2 node to generate measurement reports; and identify the measurement reports received from the E2 node.

Example 2 may include the apparatus of example 1 and/or some other example herein, wherein the measured value reporting conditions IE instructs the E2 node about inclusion of specific RAN measurement results in the measurement reports.

Example 3 may include the apparatus of example 1 and/or some other example herein, wherein the measured value reporting conditions IE instructs the E2 node about exclusion of specific RAN measurement results from the measurement reports.

Example 4 may include the apparatus of example 1 and/or some other example herein, wherein the E2 node may be an O-RAN Central Unit-Control Plane (O-CU-CP), O-RAN Central Unit-User Plane (O-CU-UP), and O-RAN Distributed Unit (O-DU).

Example 5 may include the apparatus of example 1 and/or some other example herein, wherein the measurement report comprises a value that indicates to the Near-RT RIC that a measured value did not satisfy a configured condition.

Example 6 may include the apparatus of example 1 and/or some other example herein, wherein the action definition comprises multiple measured value reporting conditions IEs.

Example 7 may include the apparatus of example 1 and/or some other example herein, wherein the measurement report comprises a "Not Valid" indication when a configured condition may be not met.

Example 8 may include the apparatus of example 1 and/or some other example herein, wherein the measured value reporting conditions IE may be a structure that comprises a test condition, a test condition value, and a logical OR.

Example 9 may include the apparatus of example 8 and/or some other example herein, wherein the test condition may be enumerated and comprises at least one of an "equal to," "greater than," "less than," "contains," or "present."

Example 10 may include a computer-readable medium storing computer-executable instructions which when executed by one or more processors result in performing operations comprising: generating radio access network (RAN) measurement parameters to configure an E2 node in Open Radio Access Network (O-RAN); transmitting an action definition to the E2 node through an E2 interface, wherein the action definition comprises a measured value reporting conditions information element (IE) based on the RAN measurement parameters, indicating to the E2 node to generate measurement reports; and identifying the measurement reports received from the E2 node.

Example 11 may include the computer-readable medium of example 10 and/or some other example herein, wherein the measured value reporting conditions IE instructs the E2 node about inclusion of specific RAN measurement results in the measurement reports.

Example 12 may include the computer-readable medium of example 10 and/or some other example herein, wherein the measured value reporting conditions IE instructs the E2 node about exclusion of specific RAN measurement results from the measurement reports.

Example 13 may include the computer-readable medium of example 10 and/or some other example herein, wherein the E2 node may be an O-RAN Central Unit-Control Plane (O-CU-CP), O-RAN Central Unit-User Plane (O-CU-UP), and O-RAN Distributed Unit (O-DU).

Example 14 may include the computer-readable medium of example 10 and/or some other example herein, wherein the measurement report comprises a value that indicates to the Near-RT RIC that a measured value did not satisfy a configured condition.

Example 15 may include the computer-readable medium of example 10 and/or some other example herein, wherein the action definition comprises multiple measured value reporting conditions IEs.

Example 16 may include the computer-readable medium of example 10 and/or some other example herein, wherein the measurement report comprises a "Not Valid" indication when a configured condition may be not met.

Example 17 may include the computer-readable medium of example 10 and/or some other example herein, wherein the measured value reporting conditions IE may be a structure that comprises a test condition, a test condition value, and a logical OR.

Example 18 may include the computer-readable medium of example 17 and/or some other example herein, wherein the test condition may be enumerated and comprises at least one of an "equal to," "greater than," "less than," "contains," or "present."

Example 19 may include a method comprising: generating radio access network (RAN) measurement parameters to configure an E2 node in Open Radio Access Network (O-RAN); transmitting an action definition to the E2 node through an E2 interface, wherein the action definition comprises a measured value reporting conditions information element (IE) based on the RAN measurement parameters, indicating to the E2 node to generate measurement reports; and identifying the measurement reports received from the E2 node.

Example 20 may include the method of example 19 and/or some other example herein, wherein the measured value reporting conditions IE instructs the E2 node about inclusion of specific RAN measurement results in the measurement reports.

Example 21 may include the method of example 19 and/or some other example herein, wherein the measured value reporting conditions IE instructs the E2 node about exclusion of specific RAN measurement results from the measurement reports.

Example 22 may include the method of example 19 and/or some other example herein, wherein the E2 node may be an O-RAN Central Unit-Control Plane (O-CU-CP), O-RAN Central Unit-User Plane (O-CU-UP), and O-RAN Distributed Unit (O-DU).

Example 23 may include the method of example 19 and/or some other example herein, wherein the measurement report comprises a value that indicates to the Near-RT RIC that a measured value did not satisfy a configured condition.

Example 24 may include the method of example 19 and/or some other example herein, wherein the action definition comprises multiple measured value reporting conditions IEs.

Example 25 may include the method of example 19 and/or some other example herein, wherein the measurement report comprises a "Not Valid" indication when a configured condition may be not met.

Example 26 may include the method of example 19 and/or some other example herein, wherein the measured value reporting conditions IE may be a structure that comprises a test condition, a test condition value, and a logical OR.

Example 27 may include the method of example 26 and/or some other example herein, wherein the test condition may be enumerated and comprises at least one of an "equal to," "greater than," "less than," "contains," or "present."

Example 28 may include an apparatus comprising means for: generating radio access network (RAN) measurement parameters to configure an E2 node in Open Radio Access Network (O-RAN); transmitting an action definition to the E2 node through an E2 interface, wherein the action definition comprises a measured value reporting conditions information element (IE) based on the RAN measurement parameters, indicating to the E2 node to generate measurement reports; and identifying the measurement reports received from the E2 node.

Example 29 may include the apparatus of example 28 and/or some other example herein, wherein the measured value reporting conditions IE instructs the E2 node about inclusion of specific RAN measurement results in the measurement reports.

Example 30 may include the apparatus of example 28 and/or some other example herein, wherein the measured value reporting conditions IE instructs the E2 node about exclusion of specific RAN measurement results from the measurement reports.

Example 31 may include the apparatus of example 28 and/or some other example herein, wherein the E2 node may be an O-RAN Central Unit-Control Plane (O-CU-CP), O-RAN Central Unit-User Plane (O-CU-UP), and O-RAN Distributed Unit (O-DU).

Example 32 may include the apparatus of example 28 and/or some other example herein, wherein the measurement report comprises a value that indicates to the Near-RT RIC that a measured value did not satisfy a configured condition.

Example 33 may include the apparatus of example 28 and/or some other example herein, wherein the action definition comprises multiple measured value reporting conditions IEs.

Example 34 may include the apparatus of example 28 and/or some other example herein, wherein the measurement report comprises a "Not Valid" indication when a configured condition may be not met.

Example 35 may include the apparatus of example 28 and/or some other example herein, wherein the measured value reporting conditions IE may be a structure that comprises a test condition, a test condition value, and a logical OR.

Example 36 may include the apparatus of example 35 and/or some other example herein, wherein the test condition may be enumerated and comprises at least one of an "equal to," "greater than," "less than," "contains," or "present."

Example 37 may include an apparatus comprising means for performing any of the methods of examples 1-36.

Example 38 may include a network node comprising a communication interface and processing circuitry connected thereto and configured to perform the methods of examples 1-36.

Example 39 may include an apparatus comprising means to perform one or more elements of a method described in or related to any of examples 1-36, or any other method or process described herein.

Example 40 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 41 may include an apparatus comprising logic, modules, or circuitry to perform one or more elements of a method described in or related to any of examples 1-36, or any other method or process described herein.

Example 42 may include a method, technique, or process as described in or related to any of examples 1-36, or portions or parts thereof.

Example 43 may include an apparatus comprising: one or more processors and one or more computer-readable media comprising instructions that, when executed by the one or more processors, cause the one or more processors to perform the method, techniques, or process as described in or related to any of examples 1-36, or portions thereof.

Example 44 may include a signal as described in or related to any of examples 1-36, or portions or parts thereof.

Example 45 may include a datagram, packet, frame, segment, protocol data unit (PDU), or message as described in or related to any of examples 1-36, or portions or parts thereof, or otherwise described in the present disclosure.

Example 46 may include a signal encoded with data as described in or related to any of examples 1-36, or portions or parts thereof, or otherwise described in the present disclosure.

Example 47 may include a signal encoded with a datagram, packet, frame, segment, protocol data unit (PDU), or message as described in or related to any of examples 1-36, or portions or parts thereof, or otherwise described in the present disclosure.

Example 48 may include an electromagnetic signal carrying computer-readable instructions, wherein execution of the computer-readable instructions by one or more processors is to cause the one or more processors to perform the method, techniques, or process as described in or related to any of examples 1-36, or portions thereof.

Example 49 may include a computer program comprising instructions, wherein execution of the program by a processing element is to cause the processing element to carry out the method, techniques, or process as described in or related to any of examples 1-36, or portions thereof.

Example 50 may include a signal in a wireless network as shown and described herein.

Example 51 may include a method of communicating in a wireless network as shown and described herein.

Example 52 may include a system for providing wireless communication as shown and described herein.

Example 53 may include a device for providing wireless communication as shown and described herein.

An example implementation is an edge computing system, including respective edge processing devices and nodes to invoke or perform the operations of the examples above, or other subject matter described herein. Another example implementation is a client endpoint node, operable to invoke or perform the operations of the examples above, or other subject matter described herein. Another example implementation is an aggregation node, network hub node, gateway node, or core data processing node, within or coupled to an edge computing system, operable to invoke or perform the operations of the examples above, or other subject matter described herein. Another example implementation is an access point, base station, road-side unit, street-side unit, or on-premise unit, within or coupled to an edge computing system, operable to invoke or perform the operations of the examples above, or other subject matter described herein. Another example implementation is an edge provisioning node, service orchestration node, application orchestration node, or multi-tenant management node, within or coupled to an edge computing system, operable to invoke or perform the operations of the examples above, or other subject matter described herein. Another example implementation is an edge node operating an edge provisioning service, application or service orchestration service, virtual machine deployment, container deployment, function deployment, and compute management, within or coupled to an edge computing system, operable to invoke or perform the operations of the examples above, or other subject matter described herein. Another example implementation is an edge computing system operable as an edge mesh, as an edge mesh with side car loading, or with mesh-to-mesh communications, operable to invoke or perform the operations of the examples above, or other subject matter described herein. Another example implementation is an edge computing system including aspects of network functions, acceleration functions, acceleration hardware, storage hardware, or computation hardware resources, operable to invoke or perform the use cases discussed herein, with use of the examples above, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of the examples above, or other subject matter described herein. Another example implementation is an edge computing system adapted for mobile wireless communications, including configurations according to an 3GPP 4G/LTE or 5G network capabilities, operable to invoke or perform the use cases discussed herein, with use of the examples above, or other subject matter described herein. Another example implementation is a computing system adapted for network communications, including configurations according to an O-RAN capabilities, operable to invoke or perform the use cases discussed herein, with use of the examples above, or other subject matter described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource. The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some aspect of services or resources in an edge computing setting.

Additionally or alternatively, the term "Edge Computing" refers to a concept, as described in [6], that enables operator and 3rd party services to be hosted close to the UE's access point of attachment, to achieve an efficient service delivery through the reduced end-to-end latency and load on the transport network. As used herein, the term "Edge Computing Service Provider" refers to a mobile network operator or a 3rd party service provider offering Edge Computing service. As used herein, the term "Edge Data Network" refers to a local Data Network (DN) that supports the architecture for enabling edge applications. As used herein, the term "Edge Hosting Environment" refers to an environment providing support required for Edge Application Server's execution. As used herein, the term "Application Server" refers to application software resident in the cloud performing the server function.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An “ML pipeline” is a set of functionalities, functions, or functional entities specific for an ML-assisted solution; an ML pipeline may include one or several data sources in a data pipeline, a model training pipeline, a model evaluation pipeline, and an actor. The “actor” is an entity that hosts an ML assisted solution using the output of the ML model inference). The term “ML training host” refers to an entity, such as a network function, that hosts the training of the model. The term “ML inference host” refers to an entity, such as a network function, that hosts model during inference mode (which includes both the model execution as well as any online learning if applicable). The ML-host informs the actor about the output of the ML algorithm, and the actor takes a decision for an action (an “action” is performed by an actor as a result of the output of an ML assisted solution). The term “model inference information” refers to information used as an input to the ML model for determining inference(s); the data used to train an ML model and the data used to determine inferences may overlap, however, “training data” and “inference data” refer to different concepts.

The terms “instantiate,” “instantiation,” and the like as used herein refers to the creation of an instance. An “instance” also refers to a concrete occurrence of an object, which may occur, for example, during execution of program code. The term “information element” refers to a structural element containing one or more fields. The term “field” refers to individual contents of an information element, or a data element that contains content. As used herein, a “database object”, “data structure”, or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a “relation”), blocks and links between blocks in block chain implementations, and/or the like.

An “information object,” as used herein, refers to a collection of structured data and/or any representation of information, and may include, for example electronic documents (or “documents”), database objects, data structures, files, audio data, video data, raw data, archive files, application packages, and/or any other like representation of information. The terms “electronic document” or “document,” may refer to a data structure, computer file, or resource used to record data, and includes various file types and/or data formats such as word processing documents, spreadsheets, slide presentations, multimedia items, webpage and/or source code documents, and/or the like. As examples, the information objects may include markup and/or source code documents such as HTML, XML, JSON, Apex®, CSS, JSP, MessagePack™, Apache® Thrift™, ASN.1, Google® Protocol Buffers (protobuf), or some other document(s)/format(s) such as those discussed herein. An information object may have both a logical and a physical structure. Physically, an information object comprises one or more units called entities. An entity is a unit of storage that contains content and is identified by a name. An entity may refer to other entities to cause their inclusion in the information object. An information object begins in a document entity, which is also referred to as a root element (or “root”). Logically, an information object comprises one or more declarations, elements, comments, character references, and processing instructions, all of which are indicated in the information object (e.g., using markup).

The term “data item” as used herein refers to an atomic state of a particular object with at least one specific property at a certain point in time. Such an object is usually identified by an object name or object identifier, and properties of such an object are usually defined as database objects (e.g., fields, records, etc.), object instances, or data elements (e.g., markup language elements/tags, etc.). Additionally or alternatively, the term “data item” as used herein may refer to data elements and/or content items, although these terms may refer to difference concepts. The term “data element” or “element” as used herein refers to a unit that is indivisible at a given level of abstraction and has a clearly defined boundary. A data element is a logical component of an information object (e.g., electronic document) that may begin with a start tag (e.g., “<element>”) and end with a matching end tag (e.g., “</element>”), or only has an empty element tag (e.g., “<element/>”). Any characters between the start tag and end tag, if any, are the element’s content (referred to herein as “content items” or the like).

The content of an entity may include one or more content items, each of which has an associated datatype representation. A content item may include, for example, attribute values, character values, URIs, qualified names (qnames), parameters, and the like. A qname is a fully qualified name of an element, attribute, or identifier in an information object. A qname associates a URI of a namespace with a local name of an element, attribute, or identifier in that namespace. To make this association, the qname assigns a prefix to the local name that corresponds to its namespace. The qname comprises a URI of the namespace, the prefix, and the local name. Namespaces are used to provide uniquely named elements and attributes in information objects. Content items may include text content (e.g., “<element>content item</element>”), attributes (e.g., “<element attribute=”attributeValue“>”), and other elements referred to as “child elements” (e.g., “<element1><element2>content item</element2></element1>”). An “attribute” may refer to a markup construct including a name—value pair that exists within a start tag or empty element tag. Attributes contain data related to its element and/or control the element’s behavior.

The term “resource” as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A “hardware resource” may refer to compute, storage, and/or network resources provided by physical hardware element(s). A “virtualized resource” may refer to compute, storage, and/or network resources provided by virtualization infrastructure to an application, device, system, etc. The term “network resource” or “communication resource” may refer to resources that are accessible by computer devices/systems via a communications network. The term “system resources” may refer to any kind of shared entities to provide services, and may include computing and/or network resources. System resources may be considered as a set of coherent functions, network data objects or services, accessible through a server where such system resources reside on a single host or multiple hosts and are clearly identifiable. The term “channel” as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information. As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11 ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The term "SMTC" refers to an SSB-based measurement timing configuration configured by SSB-MeasurementTimingConfiguration. The term "SSB" refers to a synchronization signal/Physical Broadcast Channel (SS/PBCH) block, which includes a Primary Syncrhonization Signal (PSS), a Secondary Syncrhonization Signal (SSS), and a PBCH. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with CA. The term "Special Cell" refers to the PCell of the MCG or the PSCell of the SCG for DC operation; otherwise, the term "Special Cell" refers to the Pcell.

The term "A1 policy" refers to a type of declarative policies expressed using formal statements that enable the non-RT RIC function in the SMO to guide the Near-RT RIC function, and hence the RAN, towards better fulfilment of the RAN intent.

The term "A1 Enrichment information" refers to information utilized by Near-RT RIC that is collected or derived at SMO/non-RT RIC either from non-network data sources or from network functions themselves.

The term "A1-Policy Based Traffic Steering Process Mode" refers to an operational mode in which the Near-RT RIC is configured through A1 Policy to use Traffic Steering Actions to ensure a more specific notion of network performance (for example, applying to smaller groups of E2 Nodes and UEs in the RAN) than that which it ensures in the Background Traffic Steering.

The term "Background Traffic Steering Processing Mode" refers to an operational mode in which the Near-RT RIC is configured through O1 to use Traffic Steering Actions to ensure a general background network performance which applies broadly across E2 Nodes and UEs in the RAN.

The term "Baseline RAN Behavior" refers to the default RAN behavior as configured at the E2 Nodes by SMO The term "E2" refers to an interface connecting the Near-RT RIC and one or more O-CU-CPs, one or more O-CU-UPs, one or more O-DUs, and one or more O-eNBs.

The term "E2 Node" refers to a logical node terminating E2 interface. In this version of the specification, ORAN nodes terminating E2 interface are: for NR access: O-CU-CP, O-CU-UP, O-DU or any combination; and for E-UTRA access: O-eNB.

The term "Intents", in the context of O-RAN systems/implementations, refers to declarative policy to steer or guide the behavior of RAN functions, allowing the RAN function to calculate the optimal result to achieve stated objective.

The term "O-RAN non-real-time RAN Intelligent Controller" or "non-RT RIC" refers to a logical function that enables non-real-time control and optimization of RAN elements and resources, AI/ML workflow including model training and updates, and policy-based guidance of applications/features in Near-RT RIC.

The term "Near-RT RIC" or "O-RAN near-real-time RAN Intelligent Controller" refers to a logical function that enables near-real-time control and optimization of RAN elements and resources via fine-grained (e.g., UE basis, Cell basis) data collection and actions over E2 interface.

The term "O-RAN Central Unit" or "O-CU" refers to a logical node hosting RRC, SDAP and PDCP protocols.

The term "O-RAN Central Unit—Control Plane" or "O-CU-CP" refers to a logical node hosting the RRC and the control plane part of the PDCP protocol.

The term "O-RAN Central Unit—User Plane" or "O-CU-UP" refers to a logical node hosting the user plane part of the PDCP protocol and the SDAP protocol The term "O-RAN Distributed Unit" or "O-DU" refers to a logical node hosting RLC/MAC/High-PHY layers based on a lower layer functional split.

The term "O-RAN eNB" or "O-eNB" refers to an eNB or ng-eNB that supports E2 interface.

The term "O-RAN Radio Unit" or "O-RU" refers to a logical node hosting Low-PHY layer and RF processing based on a lower layer functional split. This is similar to 3GPP's "TRP" or "RRH" but more specific in including the Low-PHY layer (FFT/iFFT, PRACH extraction).

The term "O1" refers to an interface between orchestration & management entities (Orchestration/NMS) and O-RAN managed elements, for operation and management, by which FCAPS management, Software management, File management and other similar functions shall be achieved.

The term "RAN UE Group" refers to an aggregations of UEs whose grouping is set in the E2 nodes through E2 procedures also based on the scope of A1 policies. These groups can then be the target of E2 CONTROL or POLICY messages.

The term "Traffic Steering Action" refers to the use of a mechanism to alter RAN behavior. Such actions include E2 procedures such as CONTROL and POLICY.

The term "Traffic Steering Inner Loop" refers to the part of the Traffic Steering processing, triggered by the arrival of periodic TS related KPM (Key Performance Measurement) from E2 Node, which includes UE grouping, setting additional data collection from the RAN, as well as selection and execution of one or more optimization actions to enforce Traffic Steering policies.

The term "Traffic Steering Outer Loop" refers to the part of the Traffic Steering processing, triggered by the Near-RT RIC setting up or updating Traffic Steering aware resource optimization procedure based on information from A1 Policy setup or update, A1 Enrichment Information (EI) and/or outcome of Near-RT RIC evaluation, which includes the initial configuration (preconditions) and injection of related A1 policies, Triggering conditions for TS changes.

The term "Traffic Steering Processing Mode" refers to an operational mode in which either the RAN or the Near-RT RIC is configured to ensure a particular network performance. This performance includes such aspects as cell load and throughput, and can apply differently to different E2 nodes and UEs. Throughout this process, Traffic Steering Actions are used to fulfill the requirements of this configuration.

The term "Traffic Steering Target" refers to the intended performance result that is desired from the network, which is configured to Near-RT RIC over O1.

Furthermore, any of the disclosed embodiments and example implementations can be embodied in the form of various types of hardware, software, firmware, middleware, or combinations thereof, including in the form of control logic, and using such hardware or software in a modular or integrated manner Additionally, any of the software components or functions described herein can be implemented as software, program code, script, instructions, etc., operable to be executed by processor circuitry. These components, functions, programs, etc., can be developed using any suitable computer language such as, for example, Python, PyTorch, NumPy, Ruby, Ruby on Rails, Scala, Smalltalk, Java™, C++, C#, "C", Kotlin, Swift, Rust, Go (or "Golang"), EMCAScript, JavaScript, TypeScript, Jscript, ActionScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), extensible HTML (XHTML), Extensible Markup Language (XML), XML User Interface Language (XUL), Scalable Vector Graphics (SVG), RESTful API Modeling Language (RAML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, and/or any other programming language or development tools including proprietary programming languages and/or development tools. The software code can be stored as a computer- or processor-executable instructions or commands on a physical non-transitory computer-readable medium. Examples of suitable media include RAM, ROM, magnetic media such as a hard-drive or a floppy disk, or an optical medium such as a compact disk (CD) or DVD (digital versatile disk), flash memory, and the like, or any combination of such storage or transmission devices.

Abbreviations

Unless used differently herein, terms, definitions, and abbreviations may be consistent with terms, definitions, and abbreviations defined in 3 GPP TR 21.905 v16.0.0 (2019-06). For the purposes of the present document, the following abbreviations may apply to the examples and embodiments discussed herein.

TABLE 3

| Abbreviations: | |
|---|---|
| 3GPP | Third Generation Partnership Project |
| 4G | Fourth Generation |
| 5G | Fifth Generation |
| 5GC | 5G Core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |

TABLE 3-continued

| Abbreviations: | |
|---|---|
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |

TABLE 3-continued

| Abbreviations: | |
|---|---|
| CTF | Charging Trigger Function |
| CTS | Clear-to-Send |
| CW | Codeword |
| CWS | Contention Window Size |
| D2D | Device-to-Device |
| DC | Dual Connectivity, Direct Current CHannel |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPT | S Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance tableManagement Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |

TABLE 3-continued

| Abbreviations: | |
|---|---|
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl .: Global Navigation Satellite System) |
| gNB | Next Generation NodeB |
| gNB-CU | gNB-centralized unit, Next Generation NodeB centralized unit |
| gNB-DU | gNB-distributed unit,Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Special Mobile |
| GTP | GPRS Tunneling Protocol |

TABLE 3-continued

| Abbreviations: | |
|---|---|
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |

TABLE 3-continued

| Abbreviations: | |
|---|---|
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |

TABLE 3-continued

| Abbreviations: | |
|---|---|
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MC | Measurement Object, Mobile Originated |
| MPBCH | MTC Physical Broadcast CHannel |
| MPDCCH | MTC Physical Downlink Control CHannel |
| MPDSCH | MTC Physical Downlink Shared |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |

TABLE 3-continued

| Abbreviations: | |
|---|---|
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-POP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |

TABLE 3-continued

| Abbreviations: | |
|---|---|
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |

TABLE 3-continued

| Abbreviations: | |
|---|---|
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI Identifier | QoS Flow ID, QoS Flow |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |

TABLE 3-continued

| Abbreviations: | |
|---|---|
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |

TABLE 3-continued

| Abbreviations: | |
|---|---|
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |

TABLE 3-continued

| Abbreviations: | |
|---|---|
| TAI | Tracking Area Identity |
| TAU | |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VOIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | extensible Markup Language |
| XRES | Expected user RESponse |
| XOR | eXclusive OR |
| ZC | Zadoff-Chu |
| ZP | Zero Po |

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

What is claimed is:

1. An apparatus for a Near-Real Time (Near-RT) RAN intelligent controller (RIC) comprising:

a processing circuitry configured to:

generate radio access network (RAN) measurement parameters to configure an E2 node in Open Radio Access Network (O-RAN);

transmit an action definition to the E2 node through an E2 interface, wherein the action definition comprises a measured value reporting conditions information element (IE) based on the RAN measurement parameters, indicating to the E2 node to generate measurement reports by inserting a "Not Valid" choice code point in an Abstract Syntax Notation One (ASN.1) reporting record structure for a measured value that does not satisfy a configured reporting condition; and identify the measurement reports received from the E2 node; and a memory to store the RAN measurement parameters.

2. The apparatus of claim 1, wherein the measured value reporting conditions IE instructs the E2 node about inclusion of specific RAN measurement results in the measurement reports.

3. The apparatus of claim 1, wherein the measured value reporting conditions IE instructs the E2 node about exclusion of specific RAN measurement results from the measurement reports.

4. The apparatus of claim 1, wherein the E2 node is an O-RAN Central Unit-Control Plane (O-CU-CP), O-RAN Central Unit-User Plane (O-CU-UP), and O-RAN Distributed Unit (O-DU).

5. The apparatus of claim 1, wherein the measurement report comprises a value that indicates to the Near-RT RIC that a measured value did not satisfy a configured condition.

6. The apparatus of claim 1, wherein the action definition comprises multiple measured value reporting conditions IEs.

7. The apparatus of claim 1, wherein the measured value reporting conditions IE is a structure that comprises a test condition, a test condition value, and a logical OR.

8. The apparatus of claim 7, wherein the test condition is enumerated and comprises at least one of an "equal to," "greater than," "less than," "contains," or "present".

9. A computer-readable medium storing computer-executable instructions which when executed by one or more processors result in performing operations comprising:

generating radio access network (RAN) measurement parameters to configure an E2 node in Open Radio Access Network (O-RAN);

transmitting an action definition to the E2 node through an E2 interface, wherein the action definition comprises a measured value reporting conditions information element (IE) based on the RAN measurement parameters, indicating to the E2 node to generate measurement reports by inserting a "Not Valid" choice code point in an Abstract Syntax Notation One (ASN.1) reporting record structure for a measured value that does not satisfy a configured reporting condition; and identifying the measurement reports received from the E2 node.

10. The computer-readable medium of claim 9, wherein the measured value reporting conditions IE instructs the E2 node about inclusion of specific RAN measurement results in the measurement reports.

11. The computer-readable medium of claim 9, wherein the measured value reporting conditions IE instructs the E2 node about exclusion of specific RAN measurement results from the measurement reports.

12. The computer-readable medium of claim 9, wherein the E2 node is an O-RAN Central Unit-Control Plane (O-CU-CP), O-RAN Central Unit-User Plane (O-CU-UP), and O-RAN Distributed Unit (O-DU).

13. The computer-readable medium of claim 9, wherein the measurement report comprises a value that indicates to the Near-RT RIC that a measured value did not satisfy a configured condition.

14. The computer-readable medium of claim 9, wherein the action definition comprises multiple measured value reporting conditions IEs.

15. The computer-readable medium of claim 9, wherein the measured value reporting conditions IE is a structure that comprises a test condition, a test condition value, and a logical OR.

16. The computer-readable medium of claim 15, wherein the test condition is enumerated and comprises at least one of an "equal to," "greater than," "less than," "contains," or "present".

17. A system, comprising: at least one memory that stores computer-executable instructions; and at least one processor configured to access the at least one memory and execute the computer-executable instructions to:

generate radio access network (RAN) measurement parameters to configure an E2 node in Open Radio Access Network (O-RAN);

transmit an action definition to the E2 node through an E2 interface, wherein the action definition comprises a measured value reporting conditions information element (IE) based on the RAN measurement parameters, indicating to the E2 node to generate measurement reports by inserting a "Not Valid" choice code point in an Abstract Syntax Notation One (ASN.1) reporting record structure for a measured value that does not satisfy a configured reporting condition; and identify the measurement reports received from the E2 node.

18. The system of claim 17, wherein the measured value reporting conditions IE instructs the E2 node about inclusion of specific RAN measurement results in the measurement reports.

* * * * *